United States Patent
Kossi et al.

(10) Patent No.: US 8,073,452 B2
(45) Date of Patent: Dec. 6, 2011

(54) SYSTEM AND METHOD UTILIZING A COGNITIVE TRANSCEIVER FOR AD HOC NETWORKING

(75) Inventors: Jouni Kossi, Espoo (FI); Mika Kahola, Masala (FI)

(73) Assignee: Nokia Corporation (FI)

( * ) Notice: Subject to any disclaimer, the term of this patent is extended or adjusted under 35 U.S.C. 154(b) by 3 days.

(21) Appl. No.: 12/435,902

(22) Filed: May 5, 2009

(65) Prior Publication Data

US 2009/0270025 A1    Oct. 29, 2009

Related U.S. Application Data

(62) Division of application No. 10/969,733, filed on Oct. 20, 2004, now abandoned.

(51) Int. Cl.
*H04Q 7/20* (2006.01)
(52) U.S. Cl. .......... 455/450; 455/522; 455/412; 455/69; 455/452.1; 455/67.11; 455/67.16; 455/70; 455/452.2
(58) Field of Classification Search .................. 455/522, 455/41.2, 69, 452.1
See application file for complete search history.

(56) References Cited

U.S. PATENT DOCUMENTS

| | | | | |
|---|---|---|---|---|
| 5,970,413 | A * | 10/1999 | Gilhousen | 455/456.3 |
| 6,738,599 | B2 | 5/2004 | Black et al. | |
| 2003/0067901 | A1 | 4/2003 | Schein | |
| 2003/0181211 | A1 | 9/2003 | Razavilar et al. | |
| 2003/0203742 | A1 | 10/2003 | D'Souza et al. | |
| 2005/0208942 | A1 * | 9/2005 | Pekonen et al. | 455/436 |
| 2005/0281270 | A1 | 12/2005 | Kossi | |

FOREIGN PATENT DOCUMENTS

| | | |
|---|---|---|
| EP | 1067816 A1 | 1/2001 |
| WO | 0189154 A1 | 11/2001 |
| WO | 03043210 A1 | 5/2003 |
| WO | 2006043136 A1 | 4/2006 |

OTHER PUBLICATIONS

"Transmission System for Handheld Terminals," Digital Video Broadcasting, Jun. 2004, pp. 1-10, DVB Document A081.
Wireless Network Tutorial, retrieved online on Jan. 20, 2005, pp. 1-13.
Spectrum Policy Task Force, Nov. 2002, pp. 1-73, Federal Communications Commision.
Office Action in CA 2,580,872 dated Feb. 2, 2010, 3 pages.

* cited by examiner

*Primary Examiner* — Charles Appiah
*Assistant Examiner* — Randy Peaches
(74) *Attorney, Agent, or Firm* — Banner & Witcoff, Ltd.

(57) ABSTRACT

The present invention provides methods and apparatuses for utilizing unused portions of an allocated frequency spectrum in a wireless communications system that broadcasts content to wireless stations. A first wireless station may communicate with a second wireless station on an idle broadcast channel while keeping the resulting interference level below an acceptable maximum limit at the other wireless stations. Using interference level information that are measured at the wireless stations, the wireless station can negotiate with the other wireless station on an establishment channel for subsequent communications on one or more broadcast channels. The wireless station may receive broadcast content on a time slice that corresponds to a broadcast channel and that is further processed by the wireless station. Otherwise, the wireless station can utilize the corresponding time to measure an interference level for the corresponding channel or to transmit or receive data to/from another wireless station.

33 Claims, 19 Drawing Sheets

| | 1401(CHANNEL NUMBER) | 1403(STATUS) | 1405(MEASUREMENT) | 1407 (CHANNEL TYPE) |
|---|---|---|---|---|
| 1400 | CHANNEL 1 | ACTIVE | 93 | |
| | CHANNEL 2 | IDLE | 12 | PRIM_ESTABLISHMENT |
| | CHANNEL 3 | CURRENT | 100 | |
| | CHANNEL 4 | IDLE | 6 | COMMUNICATIONS |

700

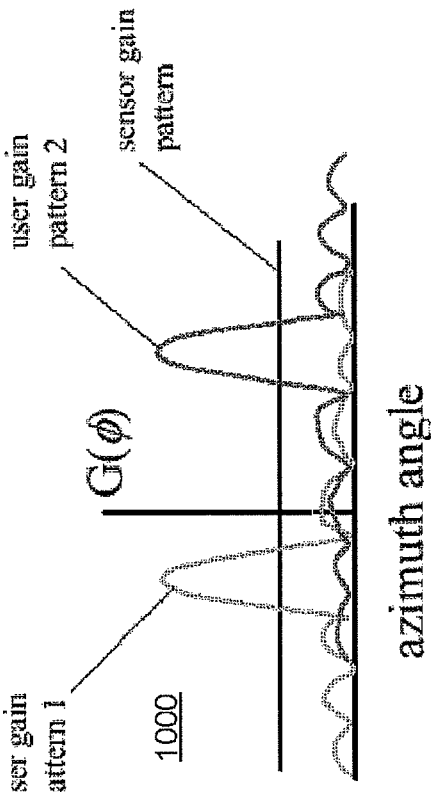
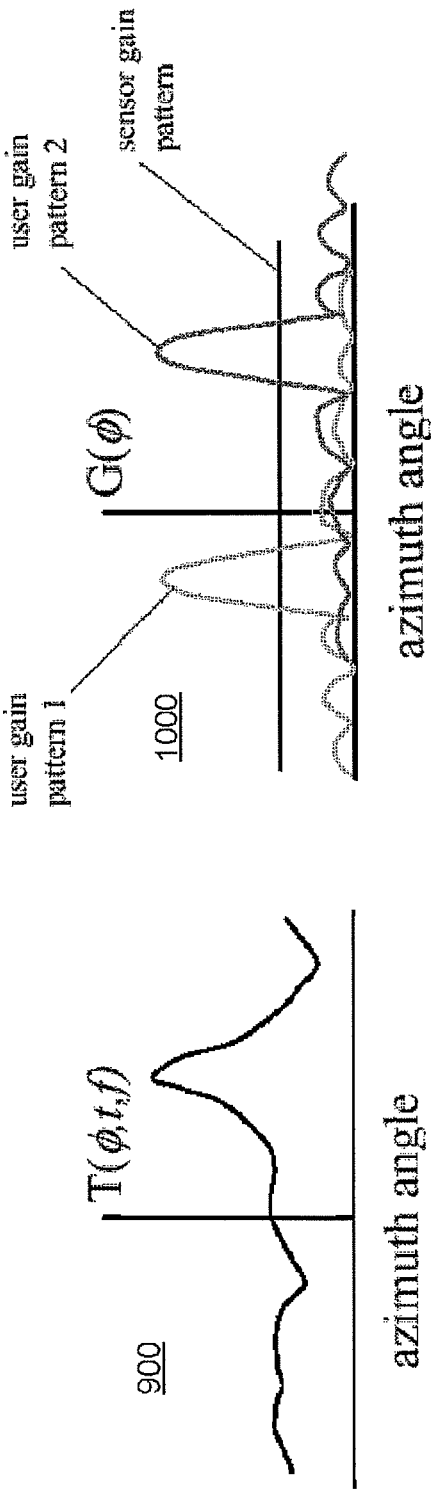
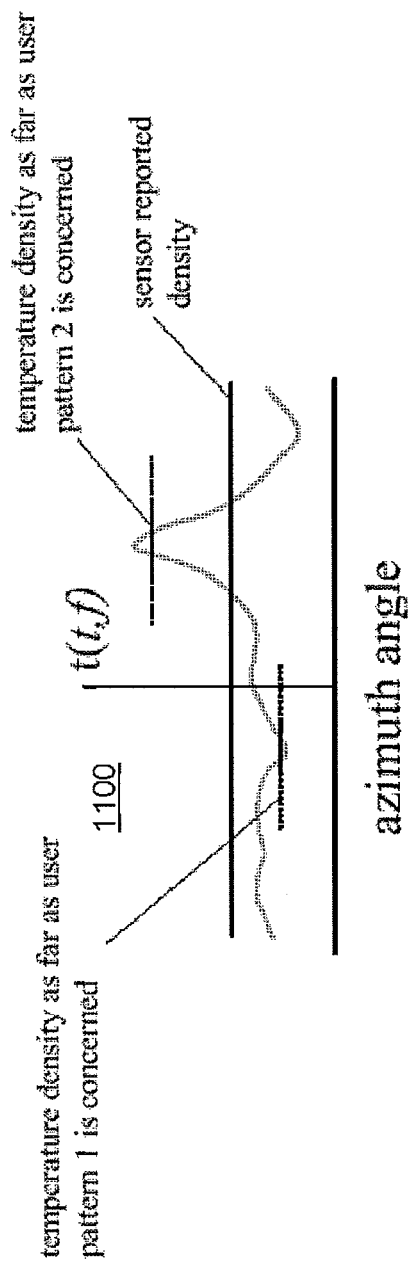
FIG. 9
FIG. 10
FIG. 11

| 1401 (CHANNEL NUMBER) | 1403 (STATUS) | 1405 (MEASUREMENT) | 1407 (CHANNEL TYPE) |
|---|---|---|---|
| CHANNEL 1 | ACTIVE | 93 | |
| CHANNEL 2 | IDLE | 12 | PRIM_ESTABLISHMENT |
| CHANNEL 3 | CURRENT | 100 | |
| CHANNEL 4 | IDLE | 6 | COMMUNICATIONS |

SYSTEM AND METHOD UTILIZING A COGNITIVE TRANSCEIVER FOR AD HOC NETWORKING

This application is a divisional of prior U.S. patent application Ser. No. 10/969,733 filed Oct. 20, 2004, and entitled "System and Method Utilizing a Cognitive Transceiver for Ad Hoc Networking," the entire disclosure of which is hereby incorporated by reference.

FIELD OF THE INVENTION

This invention relates to utilizing frequency spectrum for ad hoc networking when frequency spectrum is not being utilized for broadcast services.

BACKGROUND OF THE INVENTION

Radio frequency (RF) spectrum is a valuable resource, in which different communication services vie for the frequency spectrum. Typically, frequency spectrum is not shared by different communication services. In other words, if frequency spectrum is allocated to a communication service, other communication services are not allowed to utilize the frequency spectrum even if the allocated communication service is not currently using the frequency spectrum.

There are a plethora of wideband services that are gaining popularity and consequently are demanding greater usage of radio frequency spectrum. For example, video streaming, data streaming, and broadband digital broadcast programming are increasing in popularity in wireless network applications, e.g., Internet protocol (IP) multicast services. To support these wireless applications, wireless broadcast systems transmit data content that support data services to many wireless terminals simultaneously. A Digital Video Broadcast (DVB) system is one example of a wireless broadcast system. A DVB system may support different video services including MPEG-2 multi-media services. A DVB system typically includes multiple cell transmitters (up to hundreds) that provide RF coverage for each cell.

What are needed are systems and methods that facilitate the usage of an allocated frequency spectrum when the frequency spectrum is not being utilized by an associated service with adversely affecting the associated service.

BRIEF SUMMARY OF THE INVENTION

An aspect of the present invention provides methods and apparatuses for utilizing unused portions of an allocated frequency spectrum in a wireless communications system that broadcasts content to wireless stations. A first wireless station communicates with a second wireless station on an idle broadcast channel while keeping the resulting interference level below an acceptable maximum limit at the wireless stations.

With another aspect of the invention, wireless stations may allocate one of the idle channels as an establishment channel. When a wireless station desires to communicate with another wireless station, the wireless station may negotiate with another wireless station for subsequent communications on one or more channels.

With another aspect of the invention, a database is supported that contains channel status information. The database includes entries for wireless stations within an ad hoc network, in which each entry includes a channel number, channel status, and corresponding interference measurement. The database may be centrally located within the ad hoc network or may be maintained at each wireless station.

With another aspect of the invention, a transceiver includes a DVB-T/H receiver to receive IP packets that include broadcast content. Additionally, the transceiver may transmit and receive IP packets to other transceivers using frequency spectrum that is unused for broadcasting. The transceiver measures interference levels on broadcast channels to determine whether the corresponding broadcast channel may be used to transmit IP packets.

With another aspect of the invention, a communications system is allocated frequency spectrum to support a service for primary wireless stations. Secondary wireless stations determine if interference levels, as measured by the secondary wireless stations, is below a threshold level. If so, a secondary wireless station may send data to another secondary wireless station in an ad hoc data network.

With another aspect of the invention, a measuring station is deployed within a region of an ad hoc data network. A communications system, which is allocated a frequency spectrum, provides a service to wireless stations within the region. The measuring station gathers measured interference levels at wireless stations in order to configure a database with status information for the channels contained in the frequency spectrum. If a wireless stations desires to communicate with another wireless station within the region, the wireless station negotiates with the measuring station for channel and transmit level information.

With another embodiment of the invention, a wireless station receives broadcast content on a time slice that corresponds to a broadcast channel. If the broadcast signal is sending a time slice containing content that the wireless station is not processing, the wireless station may utilize the corresponding time to measure an interference level for the corresponding channel or to transmit or receive data to/from another wireless station.

BRIEF DESCRIPTION OF THE DRAWINGS

A more complete understanding of the present invention and the advantages thereof may be acquired by referring to the following description in consideration of the accompanying drawings, in which like reference numbers indicate like features and wherein:

FIG. 9 shows a hypothetical temperature density versus azimuth relationship in accordance with an embodiment of the invention;

FIG. 10 shows assumed user and sensor gain patterns in accordance with an embodiment of the invention;

FIG. 11 shows an effective reported and observed temperature density relationship in accordance with an embodiment of the invention;

FIG. 14 shows channel status information for an ad hoc station in accordance with an embodiment of the invention;

DETAILED DESCRIPTION OF THE INVENTION

In the following description of the various embodiments, reference is made to the accompanying drawings which form a part hereof, and in which is shown by way of illustration various embodiments in which the invention may be practiced. It is to be understood that other embodiments may be utilized and structural and functional modifications may be made without departing from the scope of the present invention.

Figure 1:
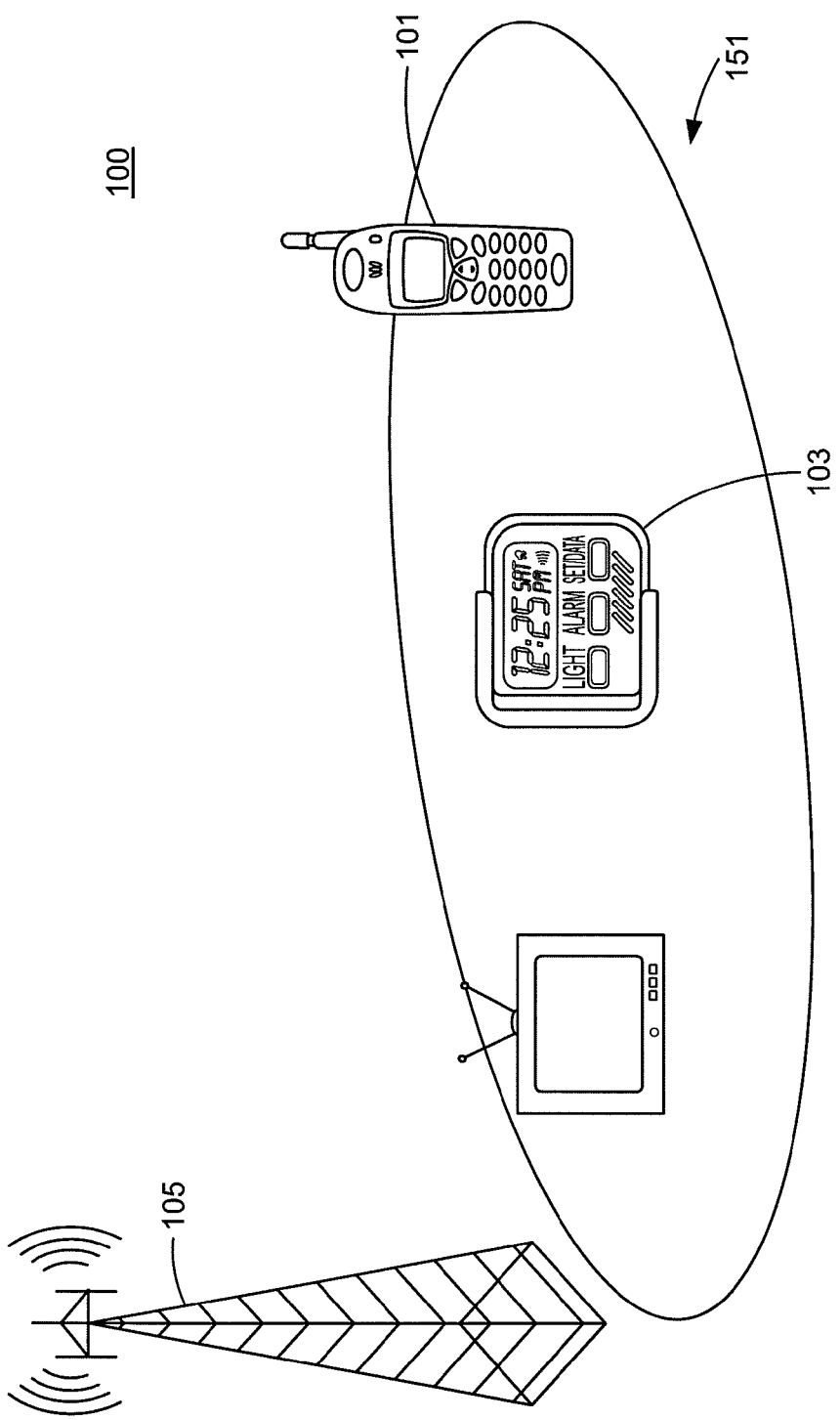
FIG. 1 shows an architecture of a Digital Video Broadcast (DVB-H) system according to prior art.

FIG. 1 shows an architecture of a Digital Video Broadcast (DVB-H) system 100 in accordance with an embodiment of the invention. DVB-H service provides mobile media services to wireless stations, e.g., handheld wireless units 101 and 103 in region 151. In the embodiment, DVB-H system 100 is compatible with DVB-T (digital video broadcast for terrestrial operation) and supports enhancements to better support operation of wireless handheld terminals. In the embodiment, transmitter 105 broadcasts multimedia services to wireless stations that are located in region 103.

DVB-H system 100 supports Internet Protocol (IP) based data services in which the information may be transmitted as IP datagrams. DVB-H system 100 incorporates enhancements (with respect to a DVB-T system) that facilitates access to IP based DVB services on wireless handheld wireless terminals. (Alternative embodiments of the invention support variations of digital video broadcast systems including DVB-T, ATSC, and ISDB-T.) The DVB-H enhancements are based on the physical layer of the DVB-T physical layer with a number of service layer enhancements aimed at improving battery life and reception in the handheld environment. Thus, the DVB-H enhancements compliment existing digital terrestrial services, offering service providers the possibility to extend the market to the wireless handheld market.

DVB-H system 100 may support time slicing transmission and handovers in order to reduce power consumption for small wireless handheld terminals. With time slicing, a cell transmitter transmits IP datagrams as data bursts in small time slots to wireless handheld terminals. (The benefits of time slicing are also applicable to other types of wireless terminals.) Consequently, the front end of a wireless terminal switches on only for small time intervals when the data bursts of the selected service are being transmitted by DVB-H system 100. Within the short period of time, data is received at a high data rate and stored in a buffer at a wireless terminal. The buffer can either store the downloaded application or continuously play live streams where the outgoing data rate depends on the application. The achievable power saving depends on the relation of the on/off time. In an embodiment of the invention, if there are approximately ten or more bursted services in a DVB-H stream, for example, the power savings consumed by the front end may be approximately 90%.

A Network Information Table (NIT) is transmitted by DVB-H system 100 and describes how transport streams are organized on the current network, and also describes some of the physical properties of the network itself. The NIT also contains the name of the network, and the network ID. This is a value that uniquely identifies the network that is currently broadcasting the transport stream, and may be different from the original network ID if the transport stream is being rebroadcast.

DVB-H system 100 may also transmit transmission parameter signaling (TPS) that conveys information regarding modulation including the $\alpha$ value of the QAM constellation pattern, hierarchy information, guard interval, inner code rates, transmission mode (2K, 4K, or 8K), frame number in a super-frame, and cell identification.

Figure 2:
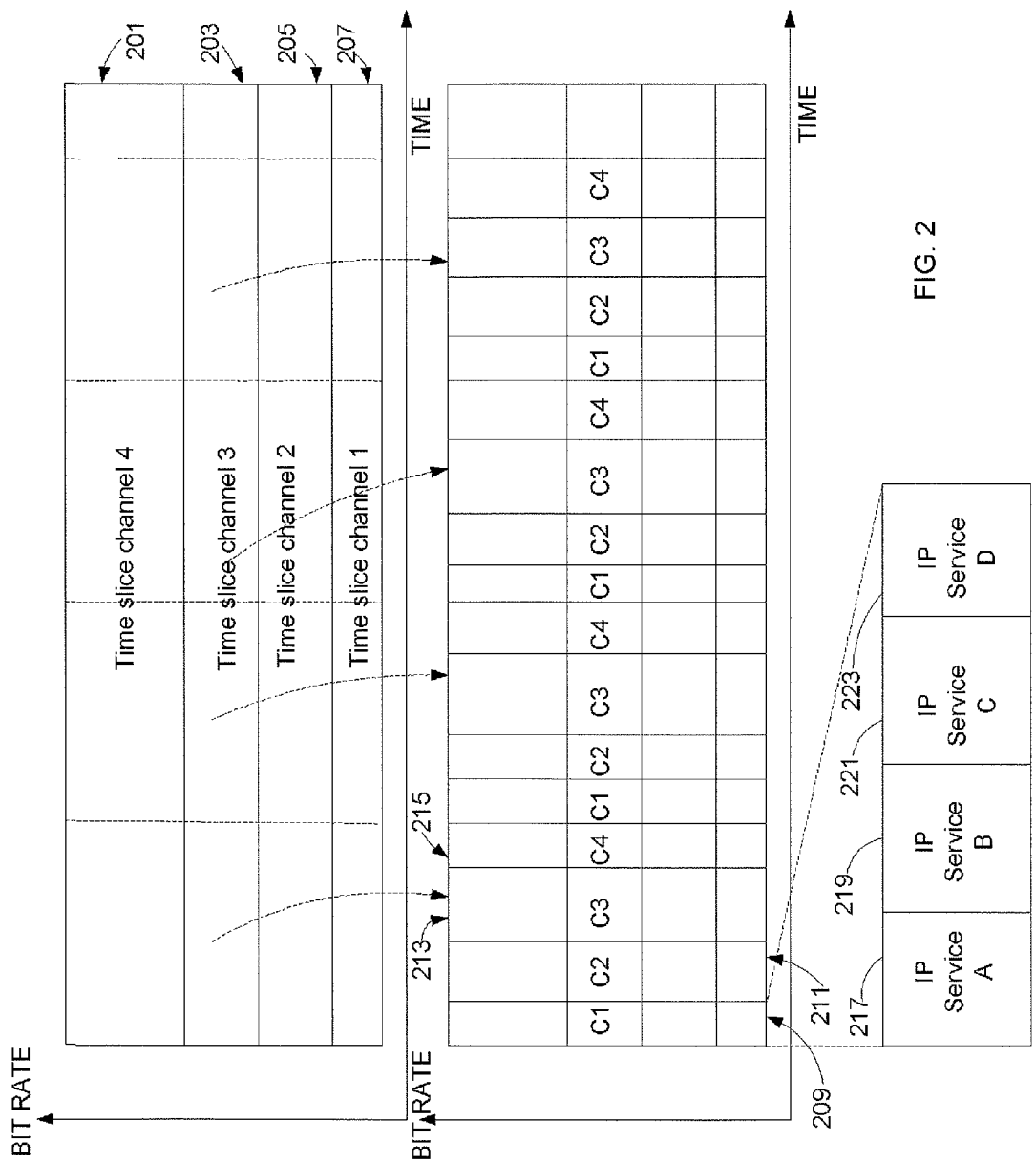
FIG. 2 shows transmission of Internet Protocol (IP) services utilizing time slice transmission in accordance with an embodiment of the invention.

FIG. 2 shows transmission of Internet Protocol (IP) services utilizing time slice transmission in accordance with an embodiment of the invention. A base station (e.g. base station 103) broadcasts data packets for a plurality of IP services using data streams 201, 203, 205, and 207. (Each data stream is allocated a portion of a data rate capacity.) In the embodiment, base station 103 may support functionality that is typically assumed by a base transceiver station (BTS), a base station controller (BSC), a combination of a BTS and a BSC, and a node B, which is a third Generation (3G) designation of a base transceiver station. Data transmission is essentially continuous such that data packets for an IP service are continuously being conveyed through a data stream.

In order to mitigate the loss of data packets, data streams 201, 203, 205, and 207 are mapped by the serving base stations into channel bursts 209, 211, 213, and 215, respectively, in which channel bursts are transmitted over radio channels rather than data streams 201, 203, 205, and 207. Each data stream (201, 203, 205, and 207), and consequently each channel burst (209, 211, 213, and 215), supports at least one data service. Thus, each channel burst may support a plurality of data services (e.g. a group of related data services). For example, in the example shown in FIG. 2, channel burst 209 supports IP services 217-223.

Data rates associated with channel bursts 209, 211, 213, and 215 are typically greater than data rates that are associated with data streams 201, 203, 205, and 207 so that a corresponding number of data packets can be sent in a shorter amount of time. In the embodiment, data streams 201, 203, 205, and 207 correspond to continuous data rates of approximately 100 Kbit/sec. Channel bursts 209, 211, 213, and 215 correspond to approximately 4 Mbit/sec with an approximate one second duration. However, other embodiments may use different data rates for data streams 201-207 and for channel bursts 209-215.

Channel bursts 209, 211, 213, and 215 may be formatted by using a multi-protocol encapsulation in accordance with Section 7 of European Standard EN 301197 "Digital Video Broadcasting (DVB), DVB specification for data broadcasting." The encapsulation may conform to Internet Protocol (IP) standards.

Figure 3:
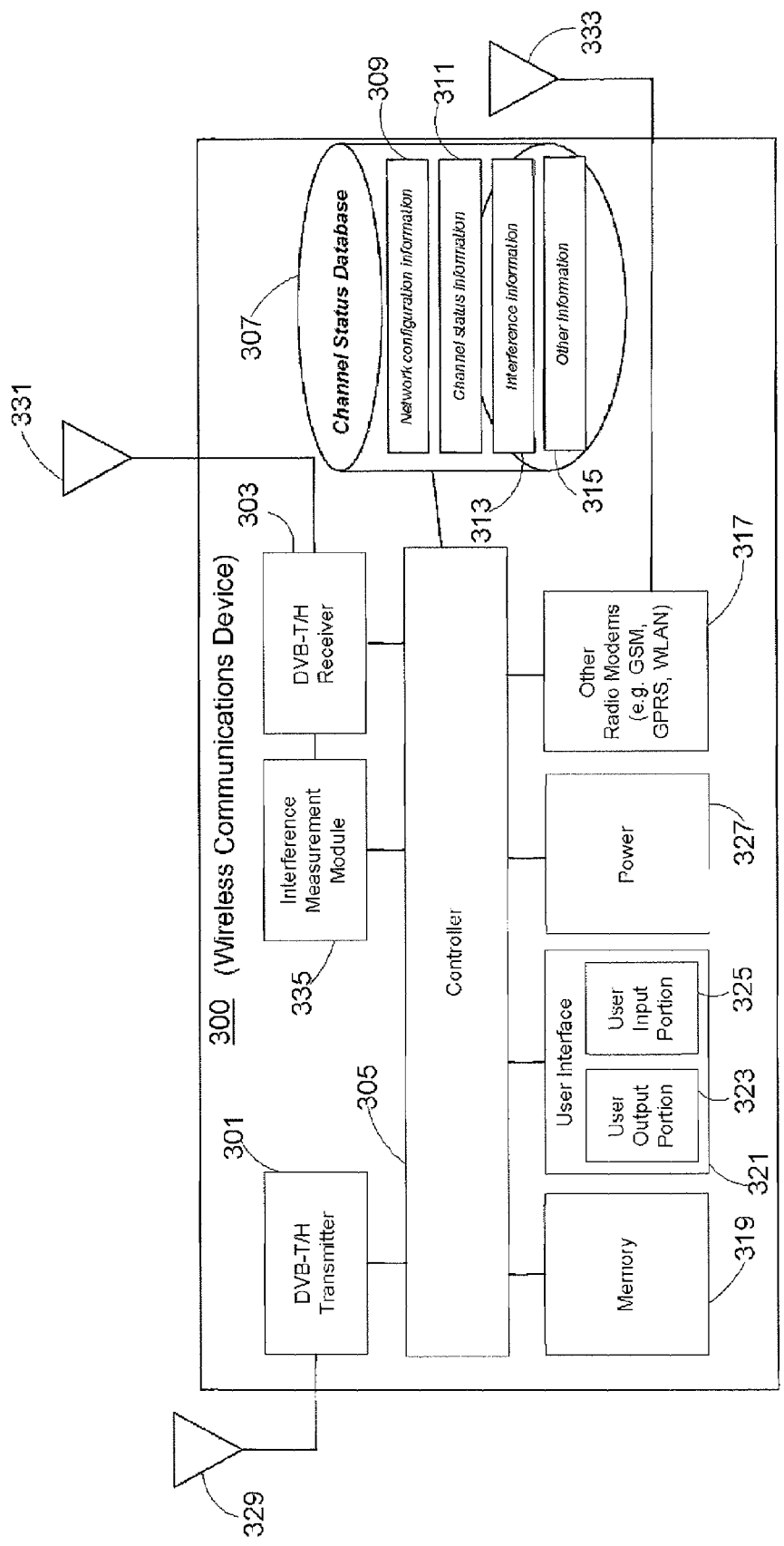
FIG. 3 shows a first architecture of a wireless communications device according to an embodiment of the invention.

FIG. 3 shows an architecture of wireless communications device 300 according to an embodiment of the invention. Transceiver 300 comprises DVB transmitter 301, DVB receiver 303, controller 305, channel status database 307, modem 317, memory 319, user interface 321, power module 327, and interference measurement module 335. In the embodiment, transceiver 300 receives and transmits information in one of the time slice channels (channels 209, 211, 213, and 215) as shown in FIG. 2. DVB receiver 331 receives broadcasted content from DVB transmitter 105. Additionally, DVB receiver supports reception of time slice transmission from another transceiver when the transceivers are communicating with each other on an unused time slice channel. Correspondingly, DVB transmitter 301 transmits in a time slice channel from transceiver 300 to the other transceiver.

DVB transmitter 301 is coupled to antenna 329, and DVB receiver 303 is coupled to antenna 331. In embodiments of the invention, antennas 329 and 331 may be physically the same antenna, where the DVB transceiver uses an antenna interface such as a directional coupler or a duplexer. Modem 317 is coupled to antenna 333. In embodiments of the invention, a wideband antenna may support the functionalities of antennas 329, 331, and 333.

Figure 13:
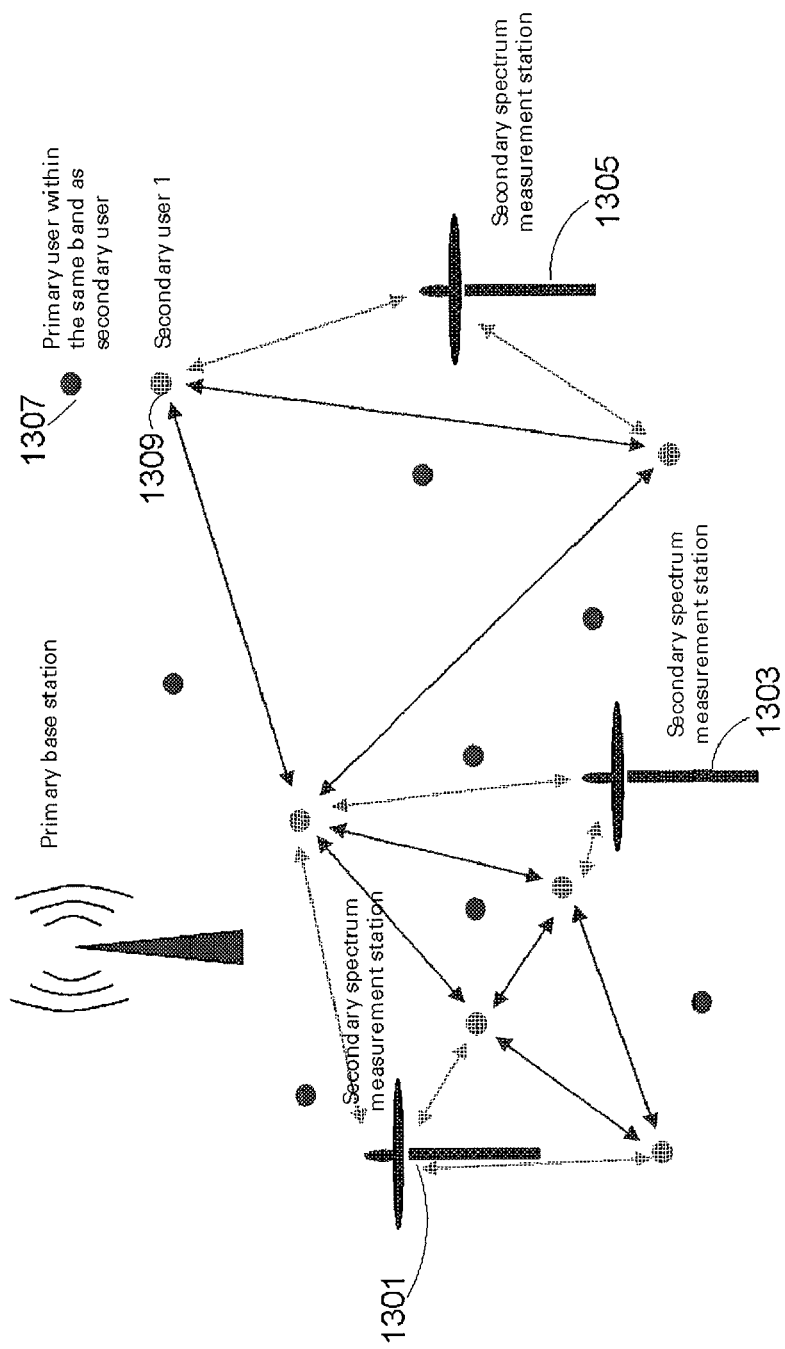
FIG. 13 shows a scenario for secondary users communicating in a system supporting primary users in accordance with an embodiment of the invention.

Controller 305 processes the data received by DVB receiver 303 and transmitted by DVB transmitter 301 on the time slice channels. Additionally, controller determines interference levels, as measured by interference measurement module 335, on each of the received time slice channels to determine whether the corresponding time slice channel is being used for broadcasting or may be used for ad hoc networking. (One approach of measuring the interference level is to determine a corresponding interference temperature as will be discussed with FIGS. 6 and 7). If controller 305 determines that a time slice channel is not used, controller 305 designates the associated channel status as "idle" (as will be discussed with FIG. 14). Transceiver 300 may share information about the measured interference levels with other transceivers. (Transceiver may share this information by communicating on a designated time slice channel or by communicating on a connection using a separate frequency spectrum through radio modem 317.) Information about the channel status of neighboring wireless stations is maintained in channel status information 311, which is contained in channel status database 307. While channel status database 307 is maintained at wireless station 300 in the embodiment, channel status database 307 may be maintained at a central database, e.g., measurement stations 1301, 1303, and 1305 as shown in FIG. 13.

Channel status database 307 includes channel status information 311 (e.g., table 1400 as shown in FIG. 14), network configuration information 309, interference information 313 as measured by interference measurement module 335, and other information 315. Channel status database 307 may include an indicator whether information is based on only the network information table (NIT), only measurements, or both. Also, although separately shown, channel status database 307 may be stored in memory 319. Memory 319 may also store instructions for controller 305 to execute in order to process the time slice channels.

User interface 321 comprises a user output portion 323, which supports the rendering of received broadcasted content, and user input portion 325, which enables a user to select programming that is supported by DVB transmitter 105 (as shown in FIG. 1). Broadcasted content may include image content, video content, audio content, or multimedia content. User output portion 323 may render received data from a broadcast system or from an ad hoc network. User input portion 325 enables the user to initiate ad hoc networking with a neighboring wireless station.

Figure 4:
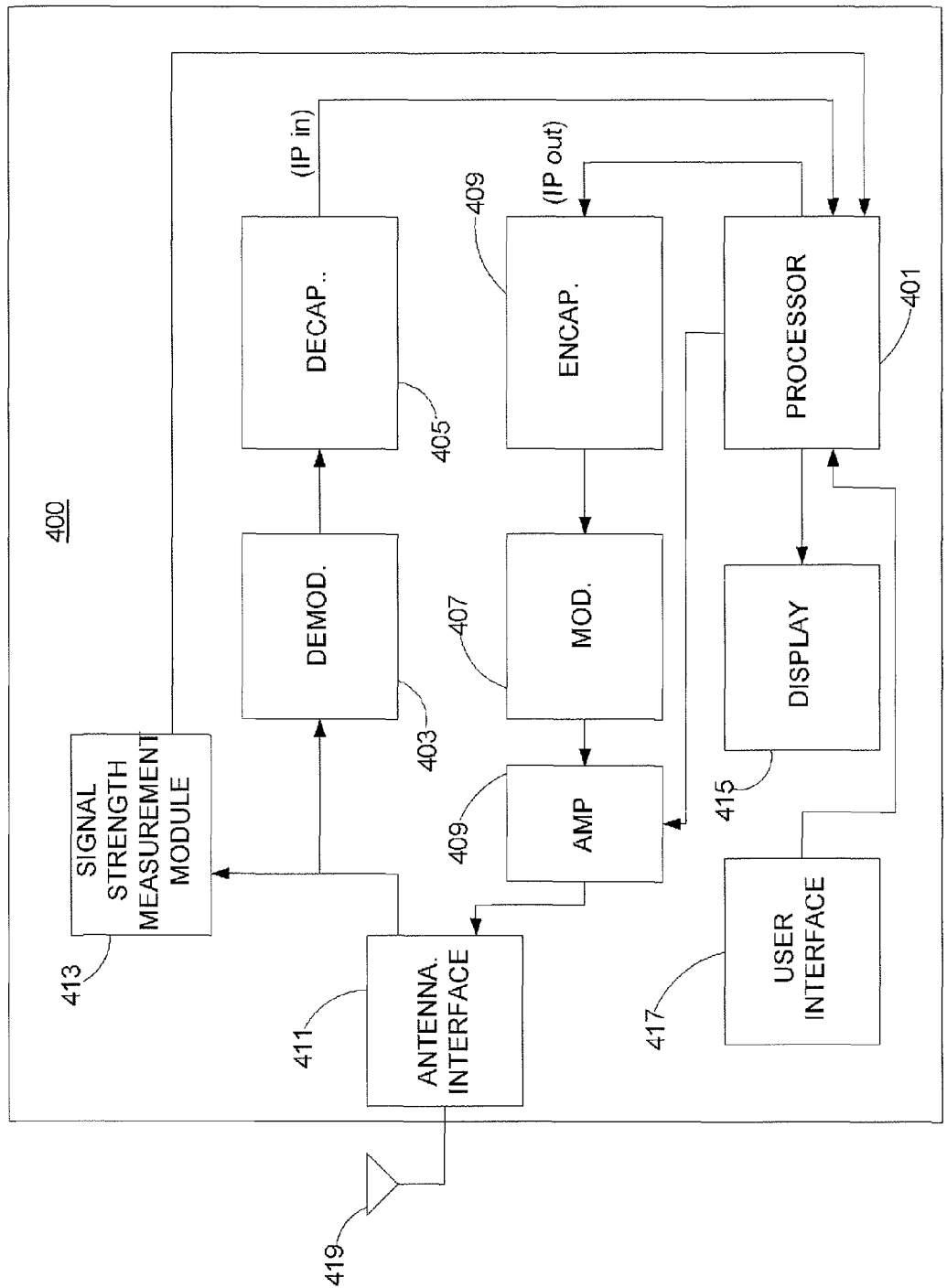
FIG. 4 shows a second architecture of a DVB transceiver according to an embodiment of the invention.

FIG. 4 shows an architecture of a DVB transceiver 400 according to an embodiment of the invention. DVB transceiver 400 receives broadcasted content (corresponding to IP packets) through antenna 419, antenna interface 411, DVB demodulator 403, and DVB IP-decapsulator 405. IP-decapsulator 405 provides IP packets to processor 401 for processing data received on time slice channels. Also, DVB demodulator 403 and DVB IP-decapsulator 405 may provide IP packets that are received from another transceiver. Transceiver 400 sends data to the other transceiver in IP packets through by DVB IP-encapsulator 409 and DVB modulator 407. Transceiver 400 adjusts the transmit power level of amplifier 409 so that the other transceiver can receive the signal while the predicted (projected) interference level at the other transceiver and at other neighboring transceivers are increased within a maximum acceptable limit.

In the embodiment shown in FIG. 4, antenna 419 supports both receiving and transmitting DVB time slice channels through antenna interface 411, which may assume different implementations such as a directional coupler or a duplexer.

Signal strength measurement module 413 measures an interference level on each time slice channel. Processor 401 determines if the interference level is sufficiently small to deem that the corresponding time slice channel is not being used (i.e., idle). Transceiver 400 may share information about the measured interference levels with other transceivers. (A transceiver may share this information by communicating on a designated time slice channel that is referred as a channel establishment channel as discussed with FIGS. 17, 18, and 20.)

Figure 5:
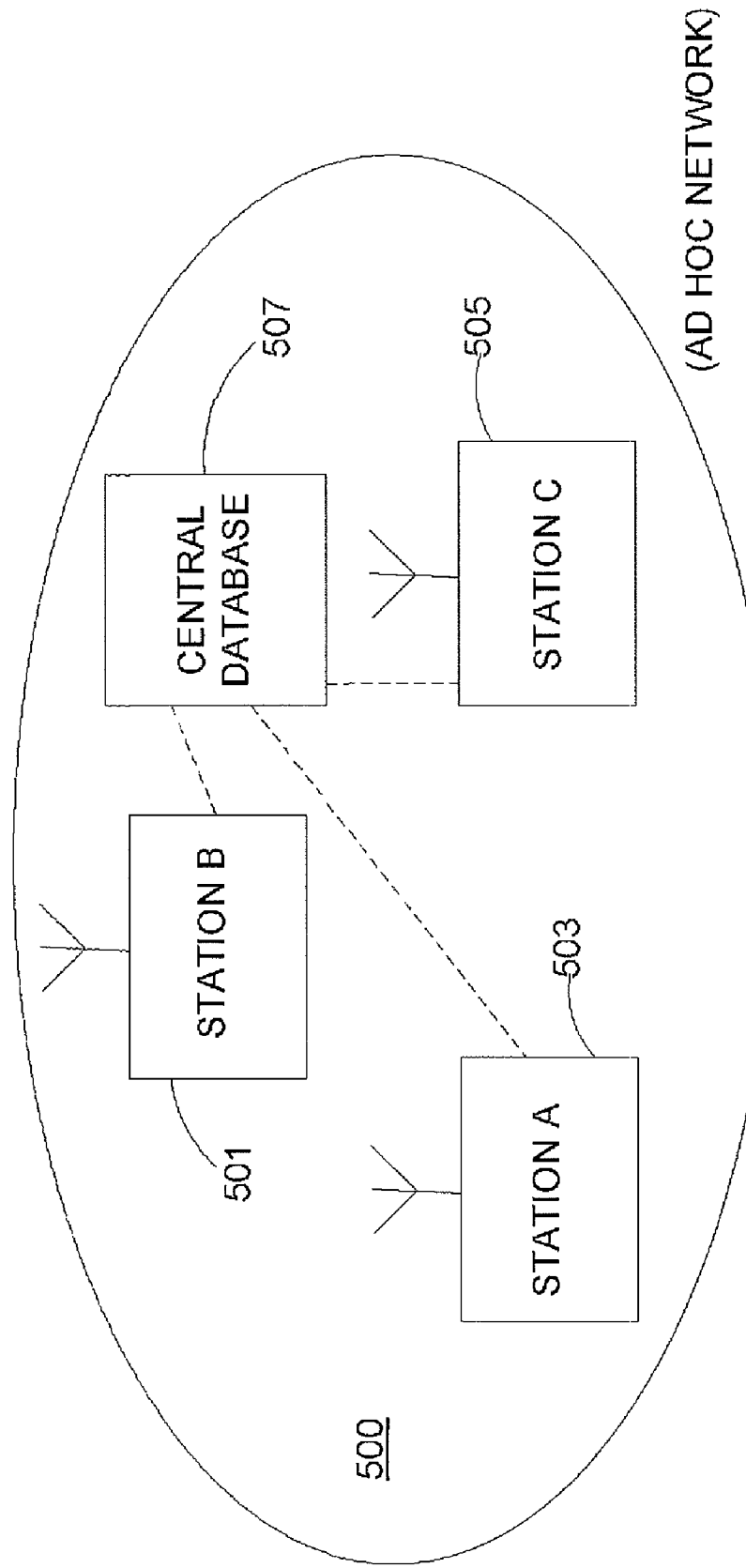
FIG. 5 shows an example of ad hoc networking in accordance with an embodiment of the invention.

FIG. 5 shows an exemplary ad hoc network 500 in accordance with an embodiment of the invention. In the exemplary configuration shown in FIG. 5, wireless stations 501, 503, and 505 are receiving broadcast content on selected time slice channels. Additionally, wireless stations 501, 503, and 505 may obtain channel status information about neighboring wireless stations from central database 507. In other embodiments of the invention, wireless stations may communicate with each other in order to obtain interference levels that are measured by other wireless stations on each DVB time slice channel. Consequently, wireless stations (e.g., stations 501 and 503) may be able to send data (e.g., images, video clips, multimedia files) to each other using idle time slice channels, providing that the transmission increases the interference level within a maximum acceptable limit.

A DVB receiver (e.g., DVB-T/H receiver 303 as shown in FIG. 3) may, in addition to receiving a signal in a channel and measuring the interference temperature, recognize the signal as originating from a DVB-T/H transmitter from TPS bits and/or from received data, e.g., from data in the received Network Information Table (NIT).

Ad hoc network 500 is a collection of nodes that form a temporary network without any centralized authority. There is no existing infrastructure. Network 500 rearranges itself as the nodes move around or enter or leave the network. Ad hoc networking has been a subject of great interests within academia during last decades. Recently, ad hoc networking has also been considered as a very attractive technology in creating new opportunities for both communications industry and the mobile end users. New business potential can be found in terminal manufacturing, software engineering and an infrastructure that interconnects ad hoc networks. Potential examples of commercial applications are related to teenager and other group networking, home networking and Internet access, authentication applications, and home networking.

The transmitter of a wireless station (e.g., station 501 as shown in FIG. 5) transmits the data preferably with full capacity of the channel, thereby minimizing the time occupying the channel. The signal from the transmitter may be formed so that it comprises data, which can be used for identifying the signal as originating from a transmitter in an ad hoc network.

Figure 6:
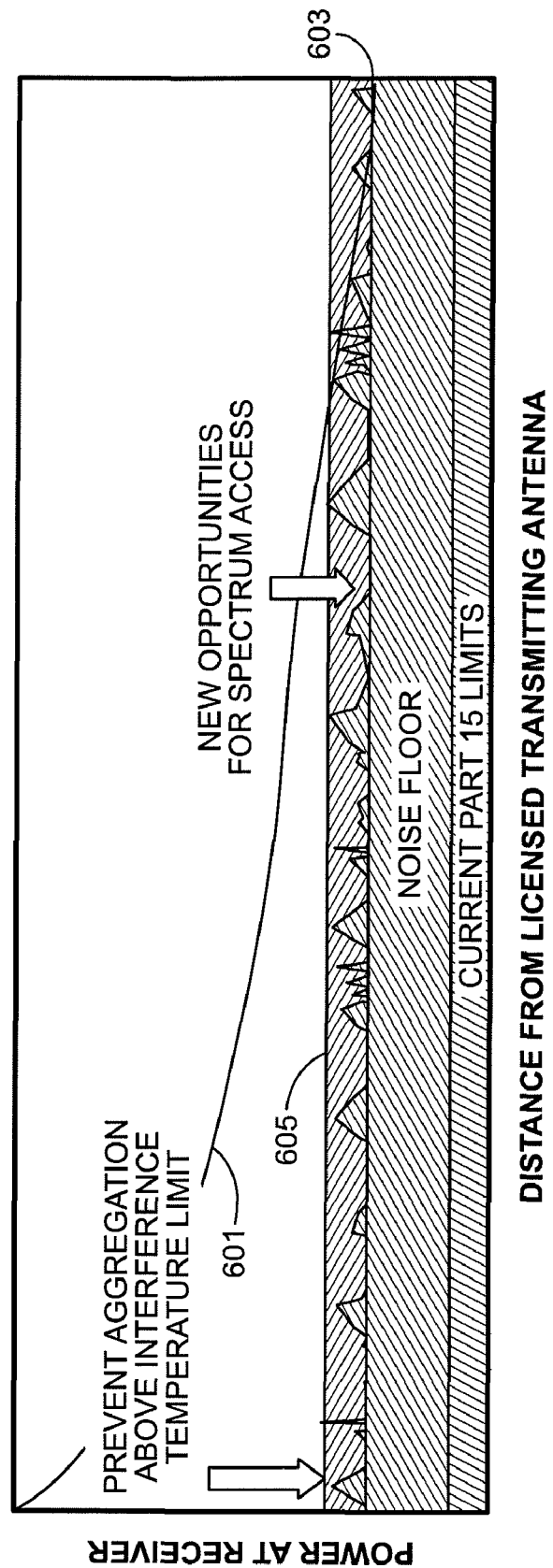
FIG. 6 shows an effect on interference temperature as a function of distance from a transmitting antenna in accordance with an embodiment of the invention.

FIG. 6 shows an effect on interference temperature as a function of distance from a transmitting antenna in accordance with an embodiment of the invention. Curve 601 shows the power measured at the receiver in relation to the distance from the transmitting antenna. As the distance increases between the transmitter and the receiver, the resulting interference level typically decreases. Without any ad hoc transmission, the noise (interference level) corresponds to interference temperature 603. However, with ad hoc transmission the additional interference level increases the noise level to interference temperature 605. If the predicted (projected) measured interference temperature is below interference temperature 605 at all wireless stations, then ad hoc networking can be supported in the corresponding region, e.g., region 500.

The bandwidth used for interference temperature measurement may be a parameter that can be chosen or that is predefined. For DVB-T/H the bandwidth can be 5, 6, 7, or 8 MHz.

Figure 7:
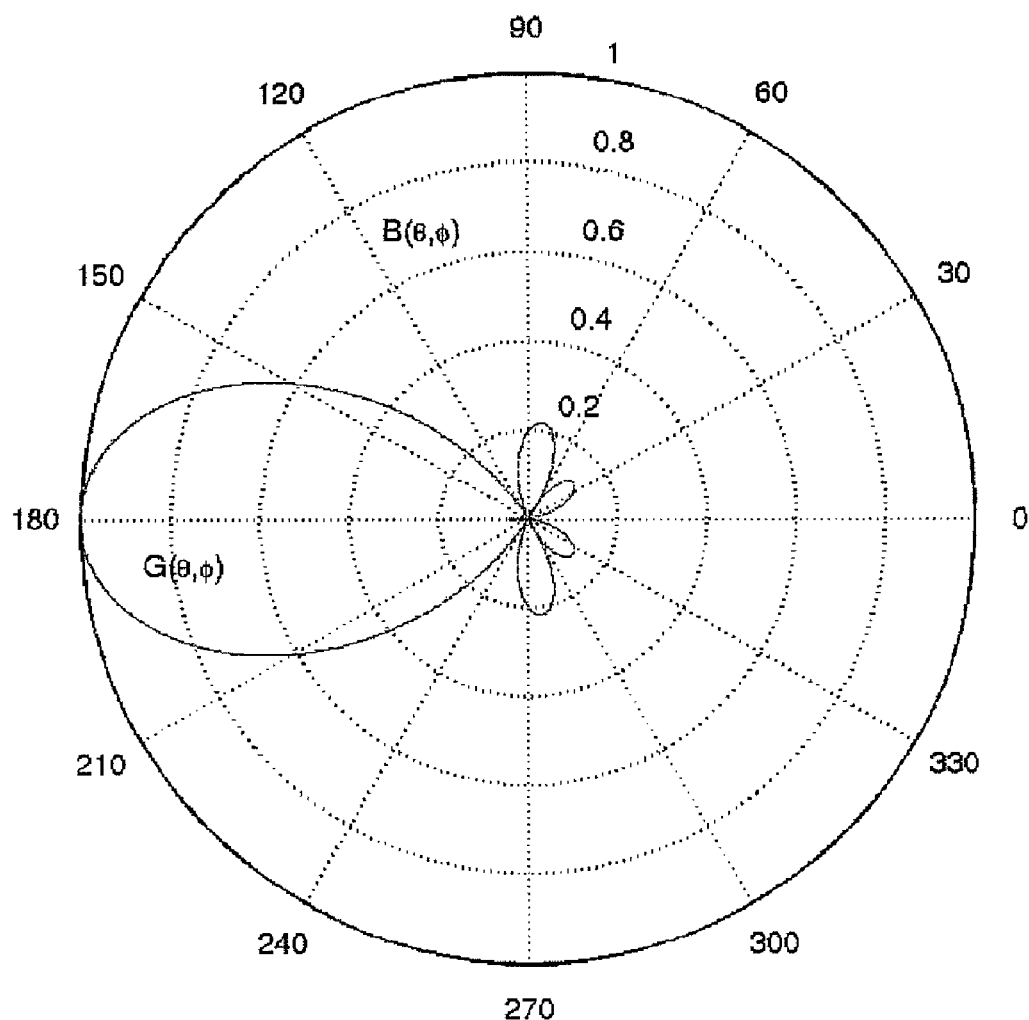
FIG. 7 shows a radiation pattern of a receiving antenna surrounded by a black body in accordance with an embodiment of the invention.

FIG. 7 shows a radiation pattern 700 of a receiving antenna surrounded by a black body in accordance with an embodiment of the invention. The Federal Communications Commission's Spectrum Policy Task Force (SPTF) introduced an innovative idea to manage spectrum in the future. The concept is defined as "interference temperature" due to measurement metrics. The Federal Communications Commission defines interference temperature as a temperature, which is equivalent to the RF power available at a receiving antenna per unit bandwidth, measured in units of °Kelvin. The acceptable "noise power" can be calculated as the equivalent temperature of the power $P_r$ received at an antenna from a source. According to the Federal Communications Commission, antenna interference temperature and antenna temperature are synonymous. By utilizing Planck's law we can calculate the intensity of radiated by a blackbody $B_v$ by:

$$B_v = \frac{2hv^3}{c^2} \frac{1}{e^{hv/kT} - 1}, \quad (1)$$

where
h Planck's constant
k Boltzmann's constant
v Frequency in Hz
c velocity of light≈3·10⁸ m/s
T physical temperature of the surface in °Kelvin.

For radio frequencies, we can approximate the intensity of the blackbody radiation by utilizing Rayleigh-Jeans limit:

$$B_v = \frac{2hv^3}{c^2} \frac{1}{\left(1 + \frac{hv}{kT} + \dots\right) - 1} \approx \frac{2hv^3}{c^2} \frac{kT}{hv} = \frac{2kTv^3}{c^2} = \frac{2kT}{\lambda^2}, \quad (2)$$

where λ is the wavelength of the radiation. The receiving antenna is surrounded by a black body as shown in FIG. 7.

The received noise power for each frequency band df can be calculated as follows:

$$P = \frac{1}{2} A_{eff} df \frac{2kT}{\lambda^2} \int\int_{4\pi} B(\theta, \phi) \frac{G(\theta, \phi)}{G_{max}} d\Omega \quad (3)$$

where
$A_{eff}$ effective area of the receiving antenna
$G(\theta,\phi)$ gain towards $(\theta,\phi)$
$G_{max}$ maximum gain of the antenna.

The coefficient ½ is due to the fact that the antenna can only receive one polarization component. The polarization of the noise randomly yields that half of its power is within certain polarization. By replacing Eq. 2 to Eq. 3, the received power is given by:

$$P = \frac{1}{2} A_{eff} df \frac{2kT}{\lambda^2} \frac{4\pi}{G_{max}} = kTdf \quad (4)$$

Thus, antenna temperature $T_A$=T. We can conclude from Eq. 4 that the received noise power is independent of antenna gain and is proportional to the black body surface temperature and the bandwidth of the frequency band.

The Federal Communications Commission's understanding of future spectrum access is based on real-time adaptation based on the actual RF environment through interactions between transmitters and receivers rather than currently applied model where access to spectrum is based on transmitter operations. The general idea of the Federal Communications Commission's interference temperature concept is that receiver is able to select and receive a particular signal that determines whether the signal has been degraded by interference. In fact, the receiver operates at the environment where the undesired RF energy is cumulatively summed into receiver's antenna. Therefore, interference temperature measurements should be performed at various receiver locations to estimate the real-time condition of RF environment. The confidence level of the estimate depends on such factors as transmitter signal ranges, uniformity, of signal levels over an area, the density of temperature measuring devices, and the sharing of the data taken by nearby devices, e.g., through ad hoc cooperative wireless networks. In an embodiment of the invention, there is a real-time database of antenna temperature levels of different devices. Each device may query the database (formed by neighboring devices) whether or not the devices use the frequency spectrum for transmission.

The concept of interference temperature defines the maximum permissible levels of interference by utilizing interference temperature or antenna temperature metric. This characterizes the "worst case" environment in which the receiver is expected to operate. In addition, different threshold levels or maximum interference temperatures could be set for each band, geographic region, or service. It is important to ensure that communication is flawless in bands that are used by security and rescue authorities or aviation radio systems. A possible thread for Public Safety bands is that a wide band radio system, such as ultra wideband (UWB), operates at moderate power levels and thus can be considered as a "local" interference source. However, even the slightest interference can be detrimental. Therefore, within these bands, the interference temperature should be set near the licensed system's noise floor.

The mechanism of measuring interference temperature must be considered. The Federal Communications Commission's SPTF suggests the following method for sensing interference temperature:

Interference temperature sensory and control mechanisms could be used to maintain both in-band and out-band emissions within permissible limits. For example, a low power unlicensed RF device could be designed to scan its particular frequency band before transmitting. Its built-in "thermometer" would record interference temperature data and compute the appropriate statistical aggregate value. The device would then project the increase in interference temperature due to its operation over its nominal range. This value would be compared with the permissible limit. If its operation would exceed the limit, the devices controller could execute an appropriate response such as reducing power, switching to a different transmit frequency (if available) or, perhaps, continuing scanning/sensing process to locate an opportune time to transmit. The technology now exists to build such sensory control systems. Automated transmitter power control, for instance, is used in certain types of wireless and satellite communications systems. Cordless telephones also adapt to environment by selecting an unused frequency.

Figure 8:
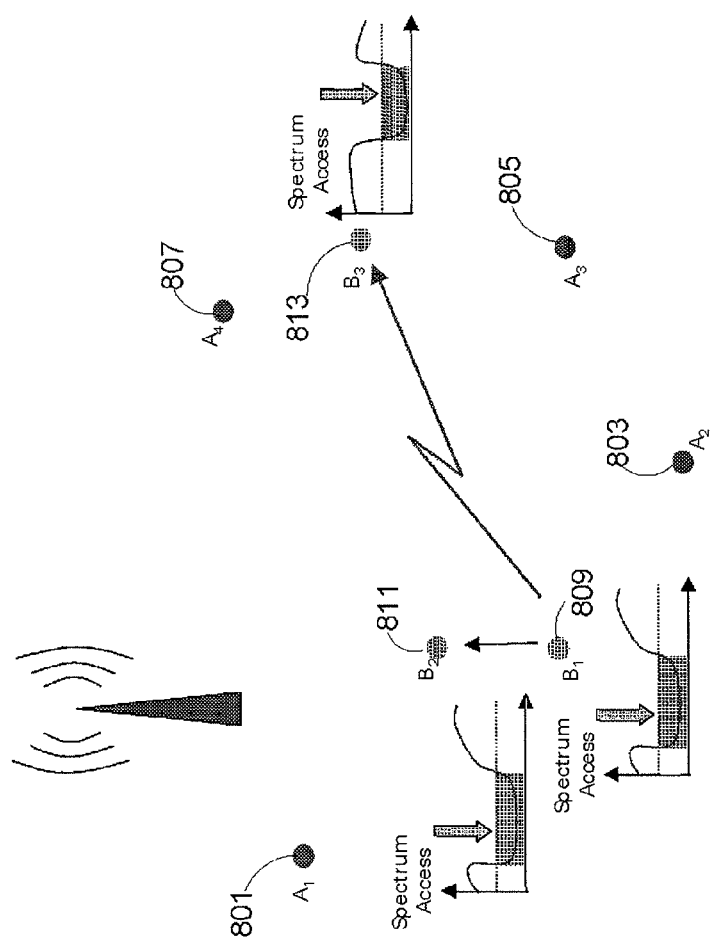
FIG. 8 shows a scenario for spectrum access in accordance with an embodiment of the invention.

FIG. 8 shows a scenario for spectrum access in accordance with an embodiment of the invention. With the scenario as shown in FIG. 8, we have cognitive radio interference in cellular network. Devices 801, 803, 805, and 807 ("A-devices") are traditional cellular devices and devices 809, 811, and 813 ("B-devices") are equipped with frequency sensing apparatus. As shown in FIG. 8, device 809 is about to transmit and sees an opportunity for spectrum access on a particular frequency spectrum df. However, it is possible that the receiving device 813 sees a different band for possible spectrum access. During the handshake phase between transmitting and receiving devices, devices 809 and 813 must negotiate the common band. This handshake is needed if transmitting and receiving devices are far apart. Even with this scenario, we cannot be sure that interference temperature cap is not exceeded if there is a traditional A-device between two B-devices. It is more likely that the interference temperature is set so low that only very short range radios can operate within interference temperature limits. This, on the other hand, means that transmitting and receiving B-devices are so close to each other that there is a high probability that both devices 809 and 811 can see the same opportunity for spectrum access. We must consider how far devices 809 and 811 can be with a desired confidence interval such that both devices 809 and 811 perceive the same opportunity for spectrum access. If we can be confident that both devices 809 and 811 see the same band for spectrum access, we could transmit and receive without negotiating the common bandwidth.

Considering the possibility that licensed bands can be utilized for licensed mobile communication during the time between a B-device measuring the interference temperature and a decision to use the band by the device, transmission must be kept as short as possible. The interference temperature measurement is a snapshot of a current situation, and consequently the situation may vary in time. In addition, we must assume that a B-device's time for transmission is short and within that time period there will be no new A-devices causing interference. This means that a B-device must transmit short bursts or perhaps impulses as an impulse radio would transmit. We must define the update interval for spectrum access for the B-device or update the interference temperature measurement results before each transmission burst.

We must also consider situations in which users are relatively far from their transmitting base stations and relatively near to an interference source. In such situations, an interference source radiates power at a "victim's" bandwidth, which is coupled into the "victim" receiver's intermediate frequency or baseband filter. The source of the interfering power may originate from near or far adjacent channel interference, strong out-of-band emission, transmitter-generated intermodulation interference, or high-level far out-of-band signals that generate intermodulation interference. The source of interference can be either a base station or a portable device.

There are two types of locations where interference becomes more likely. The most common is when a subscriber's transceiver is far from its associated base station and near to the interfering source. In this case, the loss experienced by subscriber's transceiver for desired signal is greater than the loss of undesired signal emitted by the interfering source. Therefore, interference may occur even though interfering signal is not a co-channel with the desired signal. The second example illustrates a situation where subscriber's transceiver is at the edge of the service area and its automatic power control adjusts the transmission power to its maximum permissible level. This may occur in tandem with a low-level desired signal, where the subscriber's or "victim's" transceiver is relatively far from its associated base station causing interference.

Another situation may occur when an interfering signal is being used by an interfering subscriber near the desired base receiver at the same time as the subscriber. In this case, "victim" receiver is trying to communicate on the reverse link. This situation results in interference at the base receiver, where the interfering signal degrades the reception of the desired signal.

A "hidden terminal" problem describes a problematic area of such a scenario, in which we have secondary wireless stations operating at a licensed, primary user's band. Presumably, a primary wireless station is in the idle mode, i.e., not transmitting or receiving a signal. However, a secondary wireless station may be transmitting near the primary wireless station. If the primary wireless station transmits at the same band, a collision may occur. Therefore, a secondary wireless station should detect when a "hidden" primary wireless station becomes a "visible" wireless station.

A secondary user must detect the usage of primary bands. The secondary user's transmission should be bursty in order to update the status of the band with a sufficient duty cycle. The detection may be based on either a spectrum analyzer, which is built into the terminal, or the status can be polled from the network that monitors the usage of the band.

The user quality may be become problematic due to the fact that the secondary transmission must be stopped if a primary wireless station appears on that band. The secondary wireless station may have to hold back its transmission for an unknown amount of time due to scanning of free bands that could be utilized to continue the interrupted transmission. From the end-user's point of view, this is not feasible option. However, end-users are willing to accept the poorer user quality only if the usage or service costs are minimal.

There are many technical challenges regarding the measurement of interference that is experienced by a primary user's receiver using monitoring receivers that may have different technical characteristics than the primary user's receiver. If monitoring network sensors are at ground level but the primary user's receiver is elevated (e.g., a base station tower or mobile subscriber in a multistory building) the propagation loss between the interferer and an elevated user may be different than the loss between two ground-level users. In this case, the monitored and reported interference temperature may differ from the actual interference temperature observed by primary user's receiver. This may be addressed by assuming worst-case propagation environment in the sense of interference temperature. Also, we should consider range estimation between a mobile secondary user (interferer) and a primary user. In this case, all primary mobile transceivers should report their location to the monitoring network and all possible secondary transceivers in the geographic area in real-time. At best, the sensor network would only have access to the transmission of the primary user because the primary user typically utilizes different transmit and receive frequencies.

FIG. 9 shows hypothetical temperature density versus azimuth relationship 900 in accordance with an embodiment of the invention. FIG. 10 shows assumed user and sensor gain pattern 1000 in accordance with an embodiment of the invention. FIG. 11 shows effective reported and observed temperature density relationship 1100 in accordance with an embodiment of the invention. If antenna patterns of the sensor and user's receiver differ markedly, problems may arise. If an interference temperature measuring device is equipped with omni-directional antenna, the resulting reported antenna temperature may be homogenized and any hot spots or directional variations may be smoothed out. FIGS. 9, 10, and 11 describe the dependency of the antenna temperature versus azimuth angle $\phi$, time t and frequency f. The dependence on $\phi$ is shown in FIGS. 9, 10, and 11 for purposes of clarity.

An adequate representation of antenna temperature is achieved only if the primary user's antenna and the interference temperature measuring device's antenna have a similar antenna gain. Considering that a primary user has more directional or higher gain receive antenna, including smart antenna configurations where the beamform is steerable, the interference temperature that the primary user experiences would be lower than the level measured by the monitor in receiver in some directions, while higher than expected when hot spots fall within the user's beamwidth. This type of scenarios should be taken into consideration when defining the interference temperature cap between physical noise floor and "man-made" noise floor. The cap should appropriately capture the worst-case operating environment.

Another challenge regarding the interference temperature definition is the problem, when primary user's receiver and secondary user's receiver (i.e., monitoring receivers operate at different bandwidths). A primary user may operate in a narrowband network (e.g., 25 kHz), and the secondary user may operate at wideband network monitoring interference temperature at 5 MHz bandwidth. In this case, there is 23 dB-difference in sensitivity between these two bandwidths. Assuming that there are spurious or colored noise sources that are contributing to the interference temperature (in dBm/Hz), this would be averaged and reported over the bandwidth of the sensor according to a 5 MHz bandwidth. The interference temperature would be somewhat lower in most of the band than a reported, average, interference temperature. If a particular channel contains spurious sources, the actual interference temperature would be worse than the reported, average, interference temperature. Assuming that interference temperature cap represents the worst-case operating environment, the impact of bandwidth disparities should be accounted.

Additional problems would rise if a secondary user transmits in non-stationary manner such as transmit beam forming or frequency hopping with pseudo-random pattern. These techniques add considerable variation to the noise floor yielding difficulties to predict, detect, and enforce an interference temperature cap. In addition, sudden changes can be encountered by the primary user if a secondary user moves in and out of shadowed areas. The challenge is how to manage with time delays introduced by a monitoring network to detect whether the interference has exceeded the cap. The secondary user consequently adjusts its transmitting power so that the interference temperature at the primary user's location is returned to permissible level.

Measurement of interference temperature faces the spatial, temporal, and frequency resolution challenges in a non-homogenous environment. In order to ensure the compliance with interference temperature cap and to achieve finer resolution, the channel bandwidths or antenna beamwidths should be set to minimum. However, the sweep times for monitoring process increases due to the increased number of observation points (both frequency and azimuth sweeps) and addresses another resolution problem: the duty cycle between interference measurements at any frequency or azimuth angle. This increases the likelihood that maximum actual interference temperature values are not captured in a time-varying environment such as systems utilizing packet data, beamforming or frequency hopping.

The estimation of the impact of secondary users operating in a primary user's band is a challenging task and difficult to assess by either the secondary user or a third-party monitoring network. The difficulty is the estimation of the interference temperature experienced by a primary user. The channel path loss between primary and secondary users should be estimated by utilizing insufficient channel information. The distance between primary and secondary users should be estimated. The estimation channel path loss may be estimated by utilizing worst-case scenario, i.e., assuming free path loss propagation conditions between primary and secondary users. In any case, the impact on the primary user due to the operation of secondary user sharing the same band should be minimized regarding to system deployment, coverage area, information throughput, signal quality, and radio architecture complexity.

Figure 12:
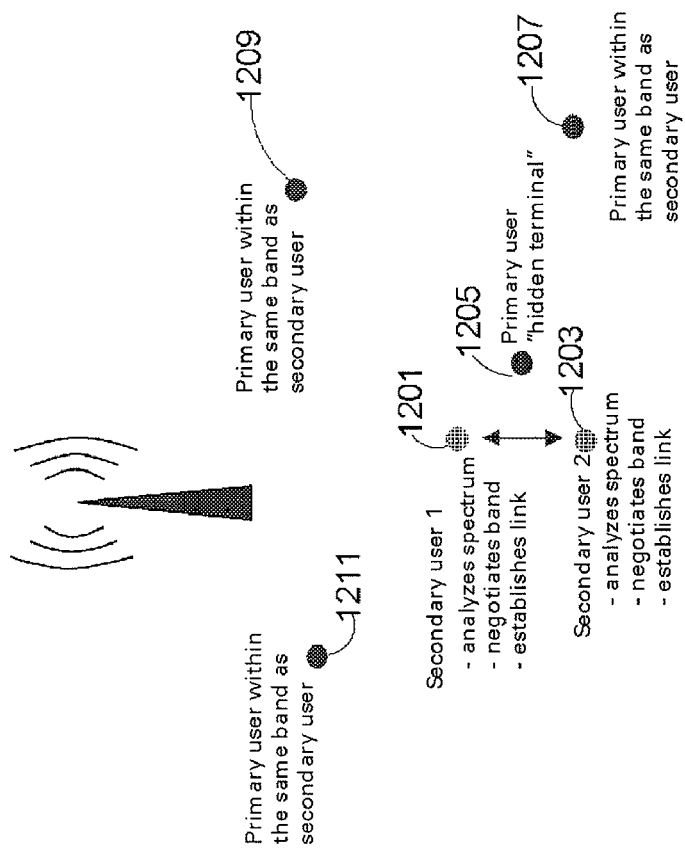
FIG. 12 shows a scenario for secondary users communicating in a system supporting primary users in accordance with an embodiment of the invention.

FIG. 12 shows a scenario for secondary users communicating in a system supporting primary users in accordance with an embodiment of the invention. The interference temperature concept is best suitable for low-power wide-bandwidth communications due to the fact that the concept limits the transmission power level to be low, just barely exceeding the existing noise floor. In addition, the range of such a device is short and could be utilized best as a cable replacement for applications demanding high data rate. The implementation of such a system utilizes the interference temperature concept. However, the device is expected to operate in licensed bands as well.

Assuming that devices are capable of measuring the available spectrum, an embodiment of the invention has spectrum analyzers implemented in the receiver. Secondary transceivers 1201 and 1203 operate in an ad hoc manner, establishing direct link between two secondary transceivers operating at primary user's band (corresponding to primary users 1205, 1207, 1209, and 1211). First, both secondary transceivers 1201 and 1203 measure the available band for transmission.

Second, secondary transceivers 1201 and 1203 negotiate with a common negotiation channel. The band that is required for transmission depends on the application and whether secondary devices 1201 and 1203 are able to reserve the amount of bandwidth that the application requires. If both secondary devices 1201 and 1203 agree that there is enough bandwidth available for transmission, transmitting secondary device 1201 or 1203 starts transmission. Otherwise, transmission is not started, and the devices return back to idle mode and sweep through the frequency range whether or not there would be a window of opportunity to transmit. If there is enough bandwidth available, transmission appears to be possible. The next step is to calculate the margin between the monitored signal level and interference temperature threshold. The transmission power is determined based on this margin. By exchanging location information by utilizing a common negotiation channel, the locations of secondary transceivers are known and the range between these two secondary transceivers is known. If the required distance is longer than the range that could be covered by utilizing the calculated maximum permissible transmission power and free-space propagation assumption, the communication fails. The schematic description of this scenario is shown in FIG. 12.

A common negotiation channel is needed in this scenario for negotiation purposes. The channel is commonly agreed in every device that utilizes interference temperature. The common negotiation channel could be reserved separately for this purpose and regulated, e.g., in the United States by the Federal Communications Commission. For example, the Federal Communications Commission has defined three different regulation models: command-and-control, exclusive use, and an open access. However, other models may be devised. In an embodiment of the invention, a "semi-commons" model controls ad hoc activity with a regulated common negotiation channel. Alternatively, a common negotiation channel may be one of the unlicensed bands requiring minimal extra regulation. However, interference protection in the common negotiation channel is important for flawless communication between secondary devices. The common negotiation channel does not have to be wideband. Narrow bandwidth is well suited for hand-shaking purposes.

As shown in FIG. 12, there may be factors that introduce a large amount of uncertainty to the system. First, there is the "Hidden Terminal Problem". If there is a "hidden" primary user 1205 between the secondary users 1201 and 1203, primary user 1205 is not transmitting at the time instance when secondary users 1201 and 1203 measure their operation environment. In this case, secondary users 1201 and 1203 do not "see" the "hidden" primary user 1205 and assume that transmission is allowed with the band that secondary users 1201 and 1203 have negotiated. However, if primary user 1205 transmits at the same time on the same band as the secondary users 1201 and 1203, there will be a collision and the primary user's transmission is interfered severely. Second, if a secondary user device monitors interference temperature or signal strength to be at certain level, we cannot guarantee that the interference temperature threshold is not exceeded at a primary user's location. This is due to the fact that we do not have the tools to estimate the range between primary and secondary users, i.e., we cannot know the transmission power level of primary user.

The severity of "hidden terminal problem" may not be overcome if the primary user's quality is assumed not to degrade. By allowing some interference, for example a call drop ratio to exceeding 1% target, the "hidden terminal problem" is not so severe because secondary user's device has a duty cycle to perform the spectrum measurements. If a secondary device detects a primary user activity, it stops transmission and continues after primary user has stopped its transmission.

The duty cycle for spectrum analyzing should be kept short and therefore requires constant monitoring for the availability of the spectrum. This requires computing power, which requires extra power from battery yielding shorter battery lifetimes. This may be tolerable if battery consumption is not the primary concern but handheld applications such as mobile terminals are sensitive to battery consumption. The improvements in the amount of energy that can be stored in a battery cell may not offset the demand of power consumption in mobile terminals. Mobile terminals need more power for the development of multi-radio terminals, where we have several radio systems integrated into a single mobile terminal. In addition, graphics and software support increases mobile terminal demands for more power from the battery. Therefore, it may not be feasible to add any additional features in the mobile terminal, which might be power consuming. The duty cycle for spectrum analyzing should be optimized in the sense of energy consumption.

FIG. 13 shows a scenario for secondary users communicating in a system supporting primary users in accordance with an embodiment of the invention. For battery saving purposes we discard the spectrum analyzer from the mobile terminal. In this case we assume that, for example, the Federal Communications Commission has set a certain bandwidth that is standardized and utilized throughout the industry. The regulation model applied in this case is not purely an "underlay" system model but could be called instead as "semi-underlay" system. Further assumptions are that the secondary devices operate at wide bandwidth with low-power and high data rate.

Discarding the spectrum analyzer from the terminal, we do not have the luxury of estimating the RF environment at the receiver. This yields more cost-efficient manufacturing of the terminals but increases the complexity of the network design. A system, as shown in FIG. 13, has a common database where information of the other users is stored. Database information is gathered from different measurement locations (1301, 1303, and 1305) that sweep the spectrum for the geographic region in question. In the embodiment, the database information is stored at each measurement station.

FIG. 13 illustrates that the secondary wide-bandwidth users (e.g., secondary user 1309) have created a mesh type of network that utilizes the information gathered by secondary measurement stations 1301, 1303, and 1305. The purpose of measurement stations 1301, 1303, and 1305 is to provide information on spectrum usage to the secondary users. For example, if secondary user 1309 wishes to transmit, user 1309 first negotiates with measurement station at the band that is commonly agreed for that purpose (on a common negotiation channel) and then establishes a link between two secondary users if measurement station allows the connection. In addition, measurement stations 1301, 1303, and 1305 are connected together to transform a network in order to provide more accurate estimates on the usage of spectrum.

There are several drawbacks for this approach. First, the sensing network may be expensive to build including expensive spectrum analyzers together with sophisticated controlling software. Second, the network should be able to detect the dynamics of the primary users (e.g., primary user 1307) in order to support mobility, including the estimation of velocity and direction of the primary user. This information must be transmitted to the secondary user 1309 with sufficient update interval. Then, what is the sufficient update interval? The update interval should be fast enough in order to react on sudden changes in primary user's network. These sudden changes could include the problem of hidden terminal. If primary user terminal 1307 suddenly starts to transmit, the sensing network should detect primary terminal 1307 and send stop transmission signal to secondary user 1309 that may transmit at the same time. In addition, the secondary user transceiver 1309 should listen to the common negotiation channel for a stop transmission signal. Even this won't totally solve the problem of a hidden terminal and, among other drawbacks, this approach could not be considered as feasible solution as an implementation of interference temperature concept. Third, sensing network should be dense in order to sense the local variations in frequency usage and to report locally to the systems utilizing interference temperature concept about the possibility to access spectrum. For low-power short range systems, this means that sensing stations can be found in every corner due to the fact that when moving around the corner the received power levels may have decreased, making spectrum access possible for devices utilizing interference temperature.

The emerging DVB-H standard is based on DVB-T, but targeted for handheld devices. New important features include MPE-FEC and time slicing. Time slicing decreases power consumption in terminal and makes handovers possible. However, the time slicing off-periods could also be utilized for other purposes, such as interference temperature measurements and ad hoc networking between terminals equipped with DVB-H transceivers.

FIG. 14 shows channel status information 1400 (which may be stored in a data structure) for an ad hoc station in accordance with an embodiment of the invention. A wireless station (e.g., transceiver 400 or 500 as shown in FIGS. 4 and 5, respectively) performs interference measurements of broadcast channels when not receiving a broadcast service on a corresponding time slice channel. In the example shown in FIG. 14, the allocated frequency spectrum comprises four time slice channels (channels 1, 2, 3, and 4) corresponding to channel number 1401 in channel status information 1400.

The wireless station may measure the interference level for a broadcast channel a plurality of times separated in time in order to obtain an estimate with a desired degree of confidence. The interference measurement (which may correspond to an interference temperature) is stored as measurement 1405 with corresponding broadcast channel number 1401. Based on measurement 1405 (e.g., if less than 20), the wireless station determines whether the broadcast channel is "idle" or not. If the broadcast channel is being used for broadcasting content, the channel is designated as "active". Moreover, if the wireless station is receiving content on the associated broadcast channel, the broadcast channel is designated as "current".

Broadcast channels that are identified transmitting DVB-T/H signals are marked as "active". If the received signal is strong enough (i.e., the measured interference temperature is above a predetermined limit), there is no need to analyze from where the received signal originates. The receiver may continue scanning of the channels. In some embodiments of the invention, "active" channels may be skipped in the next scan or for a predetermined time.

In the embodiment, the lowest idle channel is designated as the primary establishment channel. The establishment channel is used by wireless stations to establish ad hoc connections as will be explained. In the embodiment shown in FIG. 14, a second idle channel may be designated as the secondary establishment channel and may be used if a the primary establishment channel cannot be used.

The concept of interference temperature, which is a step towards cognitive radios, defines the maximum permissible levels of interference by utilizing an interference temperature or antenna temperature metric. This characterizes the "worst case" environment in which the receiver is expected to operate. In addition, different threshold levels or maximum interference temperatures may be set for each band, geographic region or service. This is an important feature of the concept. Interference temperature measurements should be taken place at various receiver locations to estimate the real-time condition of RF environment. The confidence level of this estimate depends on such factors as transmitter signal ranges, uniformity, of signal levels over an area, the density of temperature measuring devices, and the sharing of the data taken by nearby devices; e.g., through ad hoc cooperative wireless networks. This means that there exists a real-time database of antenna temperature levels of different devices. Each device could then make a query from the database (formed by neighboring devices) whether or not they could use certain band for transmission.

A substantial portion of frequency spectrum may be allocated for broadcast services (e.g. DVB-T/H). However, the entire allocated frequency spectrum may not be fully locally occupied for the broadcast traffic. Broadcast channels that are not used for broadcast transmissions (or any other transmission) may be temporary and locally allocated for communication (e.g., ad hoc networking) between cognitive DVB-H transceivers.

The interference temperature concept may be used to define whether the DVB-T/H channel is occupied or not. If a free DVB-T/H channel is found (i.e., neither DVB transmissions nor other interference sources detected), the broadcast channel may be used for communication (e.g., IP data transmission) between wireless stations. If terminal is already using the DVB-H receiver (i.e., receiving time sliced broadcast data), the wireless station is still capable of performing interference temperature measurements and communicating during the time slicing off-periods.

A wireless station (e.g., transceiver 400 and 500) comprises a DVB-H receiver and transmitter (low power) and is used for the communication and sensing the environment so that interference is not caused for other DVB-H receivers. If terminal is receiving time sliced broadcast data, the following steps can be performed during time slice off-periods. Otherwise, the DVB-H transceiver can be fully occupied for ad hoc networking.

Before ad hoc networking can be established, DVB-H receiver must scan unoccupied DVB-T/H channels during a scan procedure. During the scan process, interference measurements are performed by measuring the DVB-H receiver's antenna or equally interference temperature and results maintained (FIG. 1) in the database. DVB-T/H channels are marked as "active", "idle", "no_information" or "current". Status "active" is used if the channel is used for broadcast purposes (TV transmission). Status "idle" is used, when interference temperature is less than given threshold (T_threshold, e.g. 20, corresponding to a relative number, 0-100). Status "no_information" is used when there is not any information about the channel status (e.g. measurement is failed). Status "current" is used if terminal is also receiving time sliced bursts.

A channel with the lowest available channel (status "idle": primary_establishment_channel or secondary_establishment_channel) is used for establish the communication channel between wireless stations during an establishment procedure. The information is transmitted and received in the channel. The information is carried as a payload of IP packets.

The method to transmit IP packets over DVB-T/H channel is described in the standards. Terminal A and terminal B send messages in the establishment channel. The maximum transmission power may be based on interference measurement results. If a collision occurs, a random delay timer is set to delay the transmission. When the terminals have agreed on the channel to be used as communication channel, the terminals are tuned to the communication channel.

Wireless stations can now start to communicate during a communication procedure. The communication can be based on RTS/CTS/DATA/ACK handshaking (e.g. WLAN). When the data (corresponding to a file) is sent or connection terminated by the terminal, terminal can start a new scan procedure or listen to the establishment channel. Wireless stations must also scan the DVB-T channels during the communication state to ensure that terminals do not interfere with other terminals or systems. Also, wireless stations may tune to another broadcast channel if needed.

Figure 15:
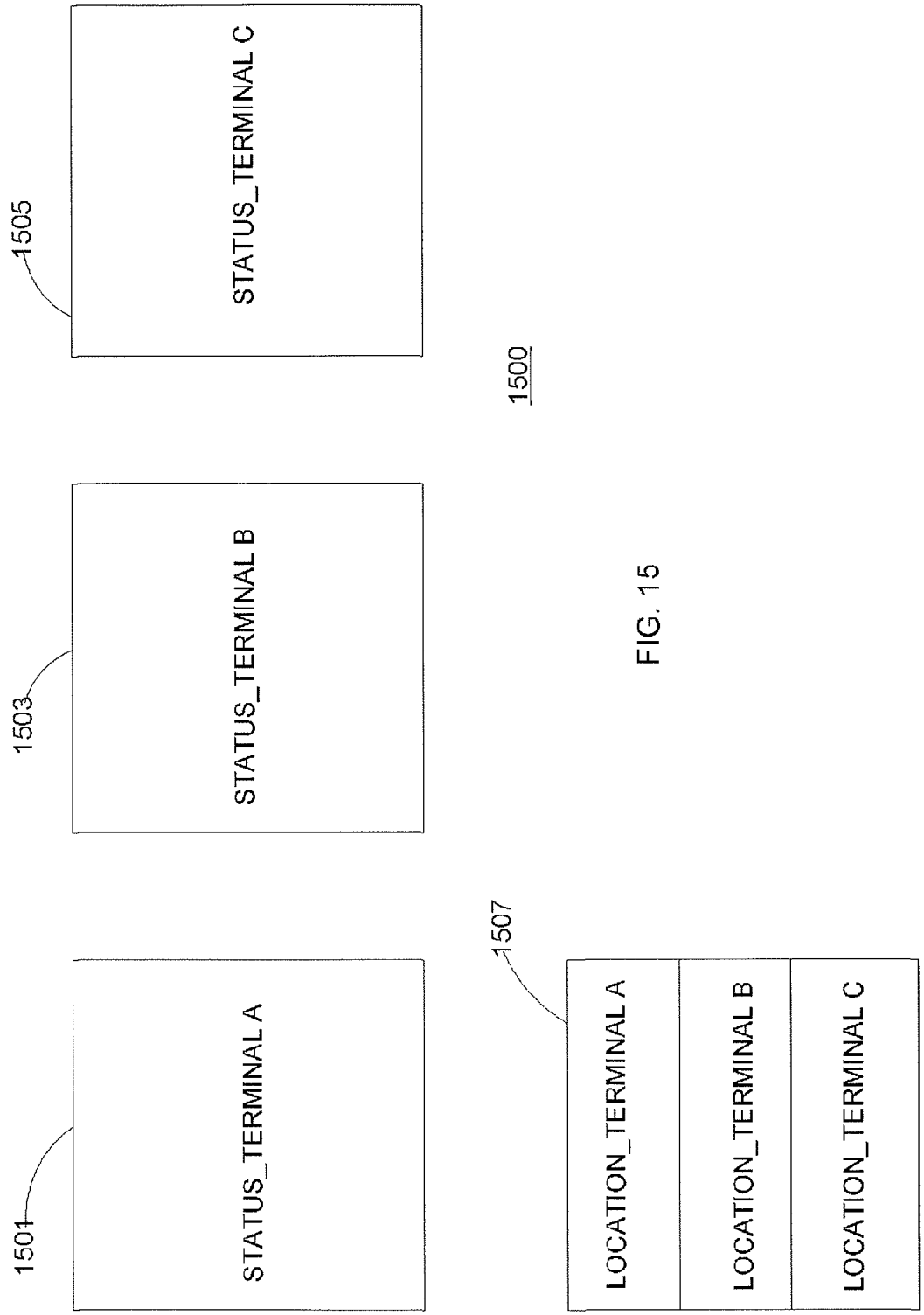
FIG. 15 shows a database with channel status information in accordance with an embodiment of the invention.

FIG. 15 shows database 1500 with channel status information in accordance with an embodiment of the invention. In the embodiment, database 1500 is stored at each wireless station (e.g., database 307 at wireless station 300 as shown in FIG. 3) in an ad hoc network or at a central database (e.g., database 507 as shown in FIG. 5) that may located in an "ad hoc network hotspot". The "ad hoc network hotspot" may a region (e.g., region 500 as shown in FIG. 5) that is engineered to operate in an area, e.g., a restaurant, an airport, or a public building.

In the embodiment, database 1500 comprises interference levels measured on each of the broadcast channels for each of the wireless stations in the ad hoc network. In the exemplary embodiment shown in FIG. 15, database 1500 comprises interference information 1501 (corresponding to wireless station A), interference information 1503 (corresponding to wireless station B), and interference information 1505 (corresponding to wireless station C). In the embodiment, database 1500 also includes location information 1507 for each of wireless stations in the ad hoc network. (A wireless station may determine its location using a GPS receiver or triangulation techniques to determine its location.) Using the location information to determine the distance to a second wireless station, a first wireless station is able to determine a transmit power level for communicating with the second wireless station while keeping the interference level at other wireless stations in the ad hoc network below a maximum acceptable interference level.

Figure 16:
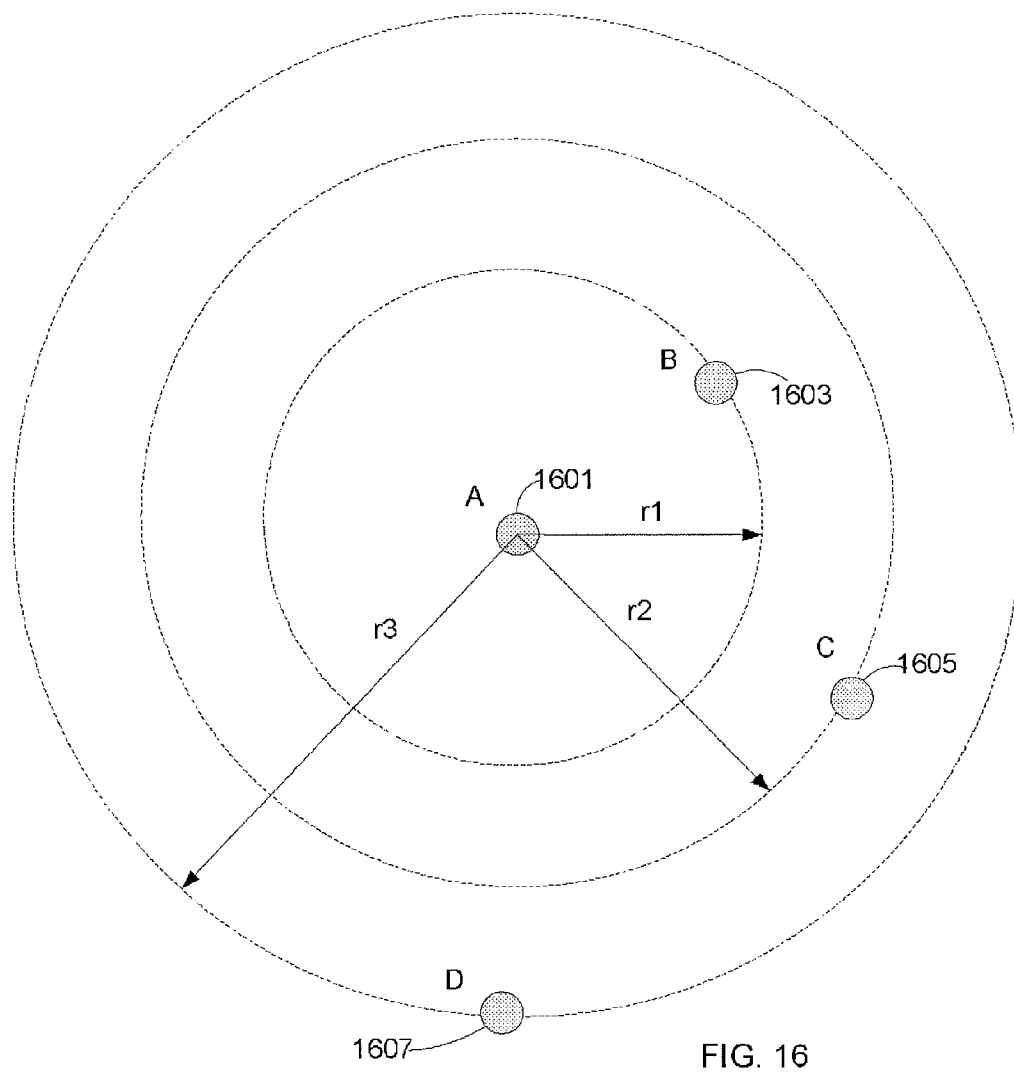
FIG. 16 shows an exemplary distribution of wireless stations in accordance with an embodiment of the invention.

FIG. 16 shows an exemplary distribution of wireless stations in accordance with an embodiment of the invention. FIG. 16 illustrates the distribution from the perspective of wireless station 1601 in an ad hoc network. Wireless station 1601 is a distance r1 from wireless station 1603, a distance r2 from wireless station 1605, and a distance r3 from wireless station 1607. A distance between wireless stations may be determined from location information contained in database 1500.

Figure 17:
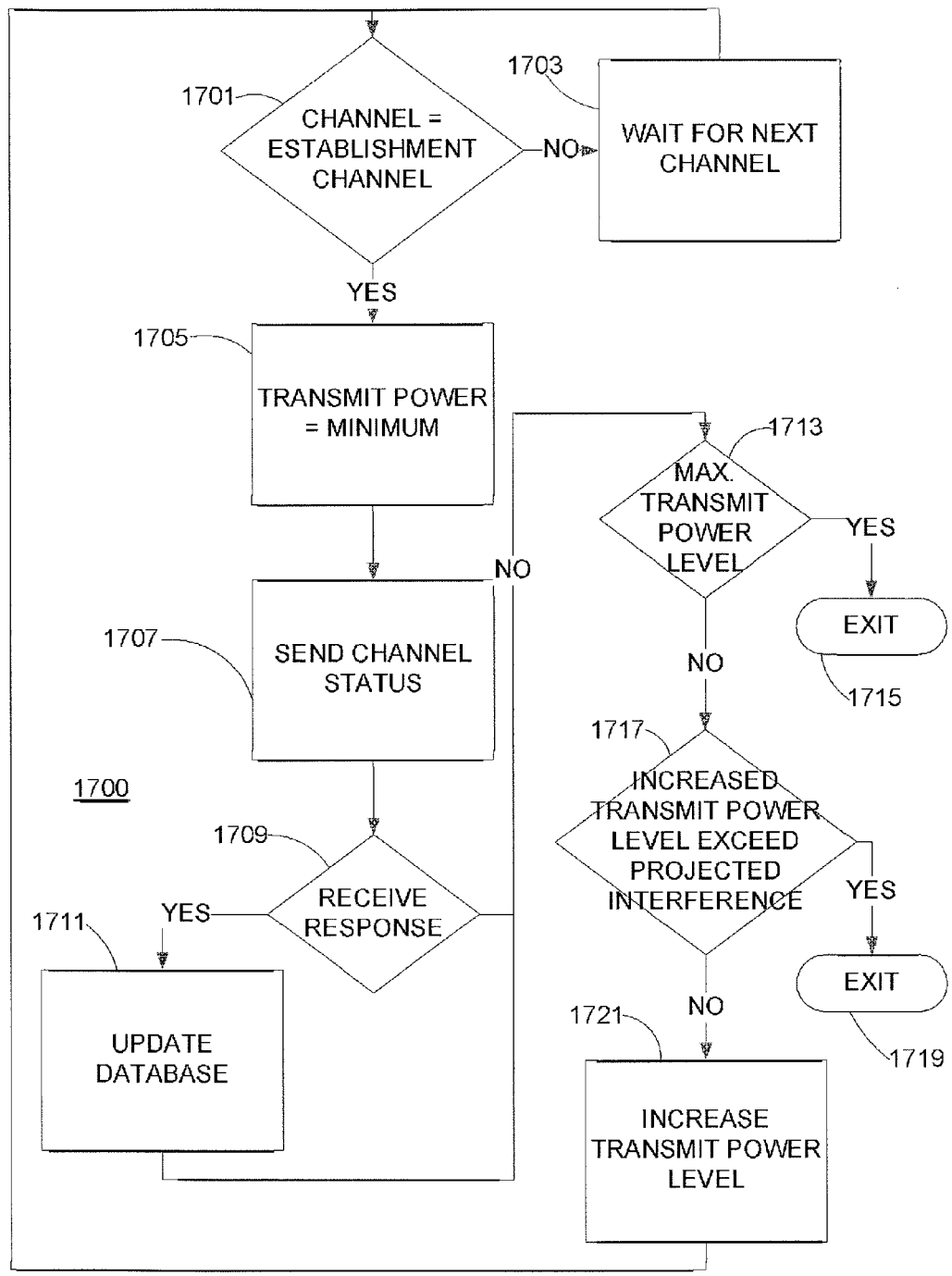
FIG. 17 shows a discovery procedure to determine neighboring ad hoc stations in accordance with an embodiment of the invention.

FIG. 17 shows discovery procedure 1700 to determine neighboring ad hoc stations in accordance with an embodiment of the invention. In the associated scenario, a wireless station does not have prior knowledge of other wireless stations in an ad hoc network. Consequently, the wireless station does not know interference levels at the other wireless stations and does not know the maximum transmit power level at which the interference level does not exceed an acceptable level.

In step 1701, the wireless station determines which broadcast channel is designated as the establishment channel. If the presently received channel does not correspond to the establishment channel, the wireless station waits until the received channel corresponds to the establishment channel in step 1703. In steps 1705 and 1707, the wireless station transmits a signal at a minimum power level, providing measured interference levels (corresponding to information 1400 as shown in FIG. 14). For example, the wireless station 1601 transmits at a transmit power level that is sufficient to communicate with station 1603 but not with stations 1605 and 1607.

In step 1709, if the wireless station receives a response (e.g., corresponding measured interference levels from another wireless station), the wireless station updates its database (e.g., database 1500) in step 1711. In step 1713, if the maximum transmit power level is exceeded, procedure 1700 is terminated in step 1715. Otherwise, the wireless station increases the transit power in step 1721 if the projected interference level at all known wireless stations in the ad hoc network does not exceed a maximum acceptable interference level as determined by step 1717. For example, wireless station 1601 increases it transmit power level to communicate with station 1605 as shown in FIG. 16. Otherwise, the procedure is terminated in step 1719.

In the embodiment shown in FIG. 1700, carrier sense multiple access/collision avoidance (CSMA/CA) resolves collisions on the establishment channel if more than one wireless station attempt to utilize the establishment channel as the same time. If a collision is detected, a back-off algorithm (CSMA/CD) may be utilized by the wireless stations in the ad hoc network in order to subsequently send data on the establishment channel. Moreover, the wireless stations may utilize a request to send/clear to send (RTS/CTS) procedure to provide robustness to potential problems (e.g., a hidden wireless station that is not known to the wireless station) that may be encountered on the establishment channel.

Figure 18:
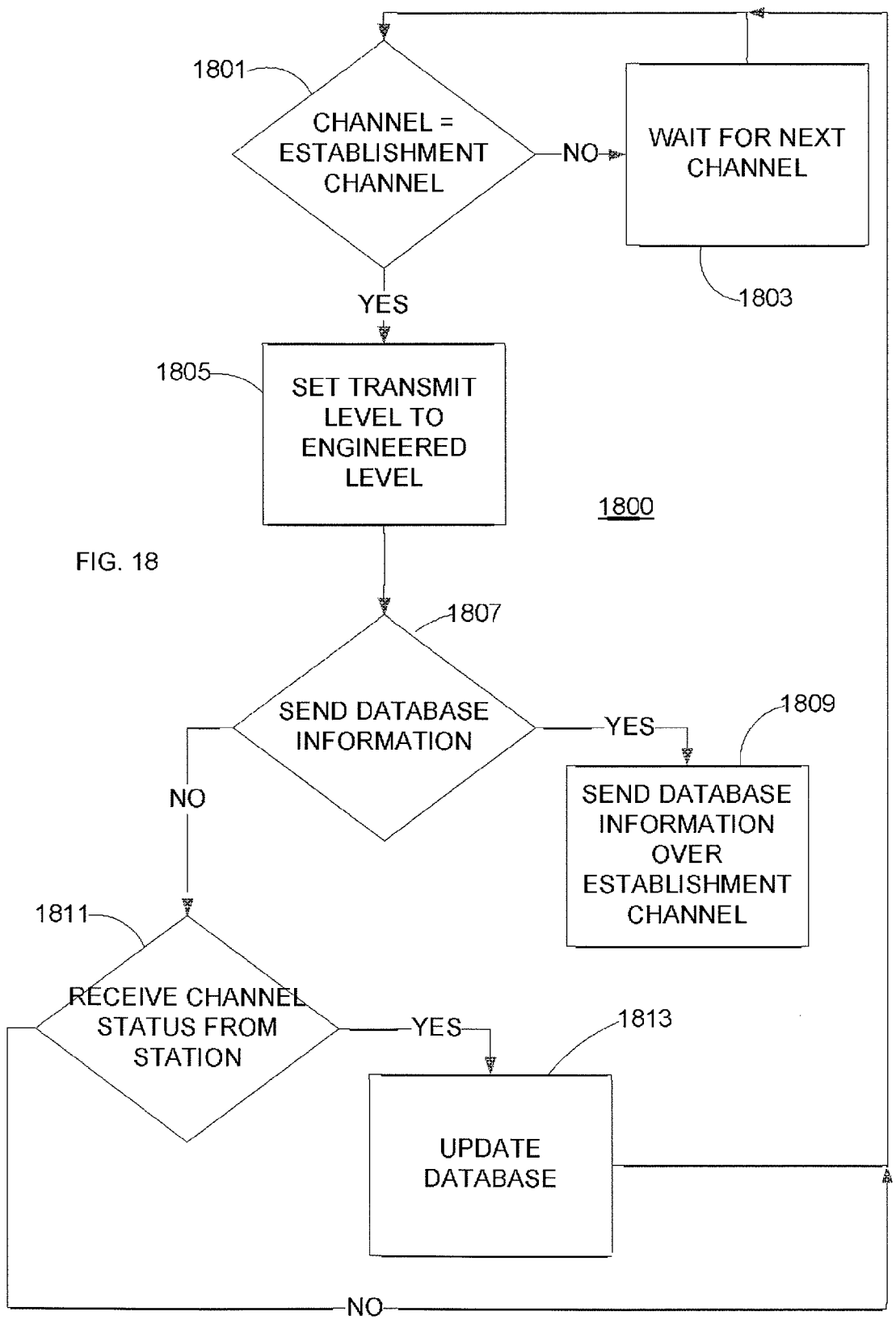
FIG. 18 shows a central database procedure to provide channel status information in accordance with an embodiment of the invention.

FIG. 18 shows central database procedure 1800 to provide channel status information in accordance with an embodiment of the invention. Procedure 1800 may be implemented as an alternative to procedure 1700 to support an ad hoc network. In step 1801, the central database (that may be implemented at measurement station 1301 as shown in FIG. 13) determines the broadcast channel designated as the establishment channel. If the presently transmitted time slot does not correspond to the establishment channel, the central database waits until the transmitted timeslot corresponds to the establishment channel in step 1803. In step 1805, the central database sets the transmit level to an engineered level for the ad hoc network (e.g., an "ad hoc network hotspot"). In the embodiment, a wireless station in the ad hoc network associated with the central database may know the engineered power level a priori or may obtain the engineered level from the central database that periodically broadcasts the transmit level on the establishment channel.

If step 1807 determines to send database information, the central database sends database information that contains interference levels as measured by the participating wireless stations in the ad hoc network in step 1809. If the central database does send not database information in the establishment channel at the current time (corresponding to a time slice, e.g., channel burst 211 as shown in FIG. 2), the central database monitors the establishment channel for channel status information (e.g., information 1400 as shown in FIG. 14) as determined by step 1811. If channel status information is received from a wireless station, the central database updates the status database (e.g., database 1500) in step 1813.

In another embodiment of the invention, the central database may utilize a spectrum analyzer (not shown but similar to what was previously described for measurement station 1301 in FIG. 13) to scan the frequency spectrum and to measure interference on the channels. The interference levels that are measured at the measurement station may be projected at a wireless station (terminal), assuming reciprocity and knowledge of the distance to the wireless station from the measurement station.

Figure 19:
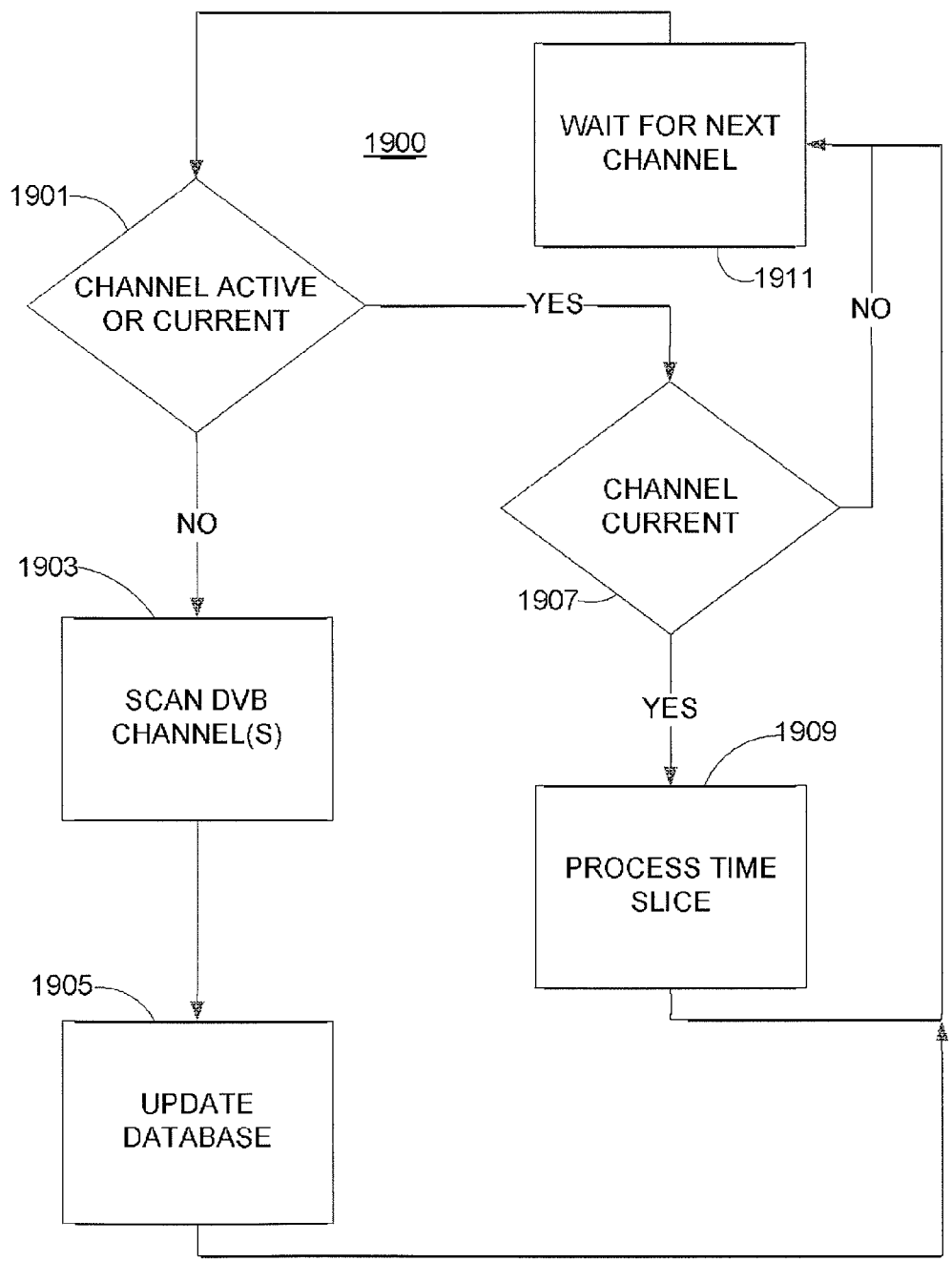
FIG. 19 shows a channel scanning process for an ad hoc station in accordance with an embodiment of the invention.

FIG. 19 shows channel scanning procedure 1900 for an ad hoc station in accordance with an embodiment of the invention. If wireless station (e.g., transceiver 300 and 400) is not processing a broadcast channel time slice, the wireless station may measure the corresponding interference level on the corresponding broadcast channel in order to populate channel status information 1400. Also, the wireless station may transmit or receive data on an unused broadcast channel.

Referring to FIG. 19, if the broadcast channel is not an "active" or "current" broadcast channel, as determined by step 1901, the wireless channel scans the broadcast channel in step 1903 in order to measure the interference level on the broadcast channel. The wireless station may determine the interference level using a plurality of measurements in order to obtain a desired confidence level. Database 1500 is updated in step 1905 with the measured interference level that is determined in step 1903.

If step 1907 determines that the broadcast channel contains DVB content to be processed by the wireless station, the wireless station processes the time slice in the broadcast channel in step 1909. Once a broadcast channel is processed, the wireless station waits for the next broadcast channel in step 1911.

Figure 20:
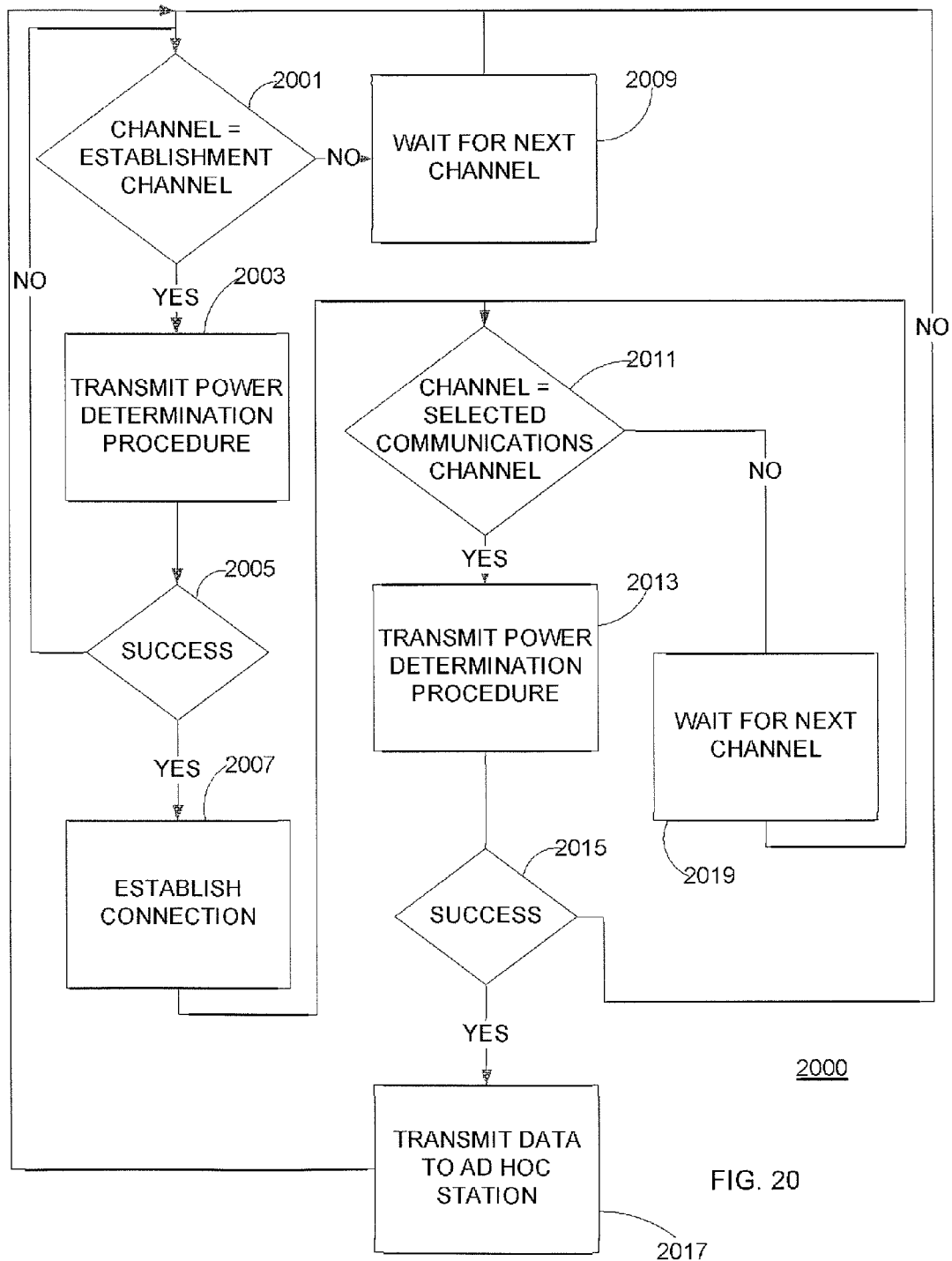
FIG. 20 shows a data transmitting procedure for an ad hoc station in accordance with an embodiment of the invention.
Figure 21:
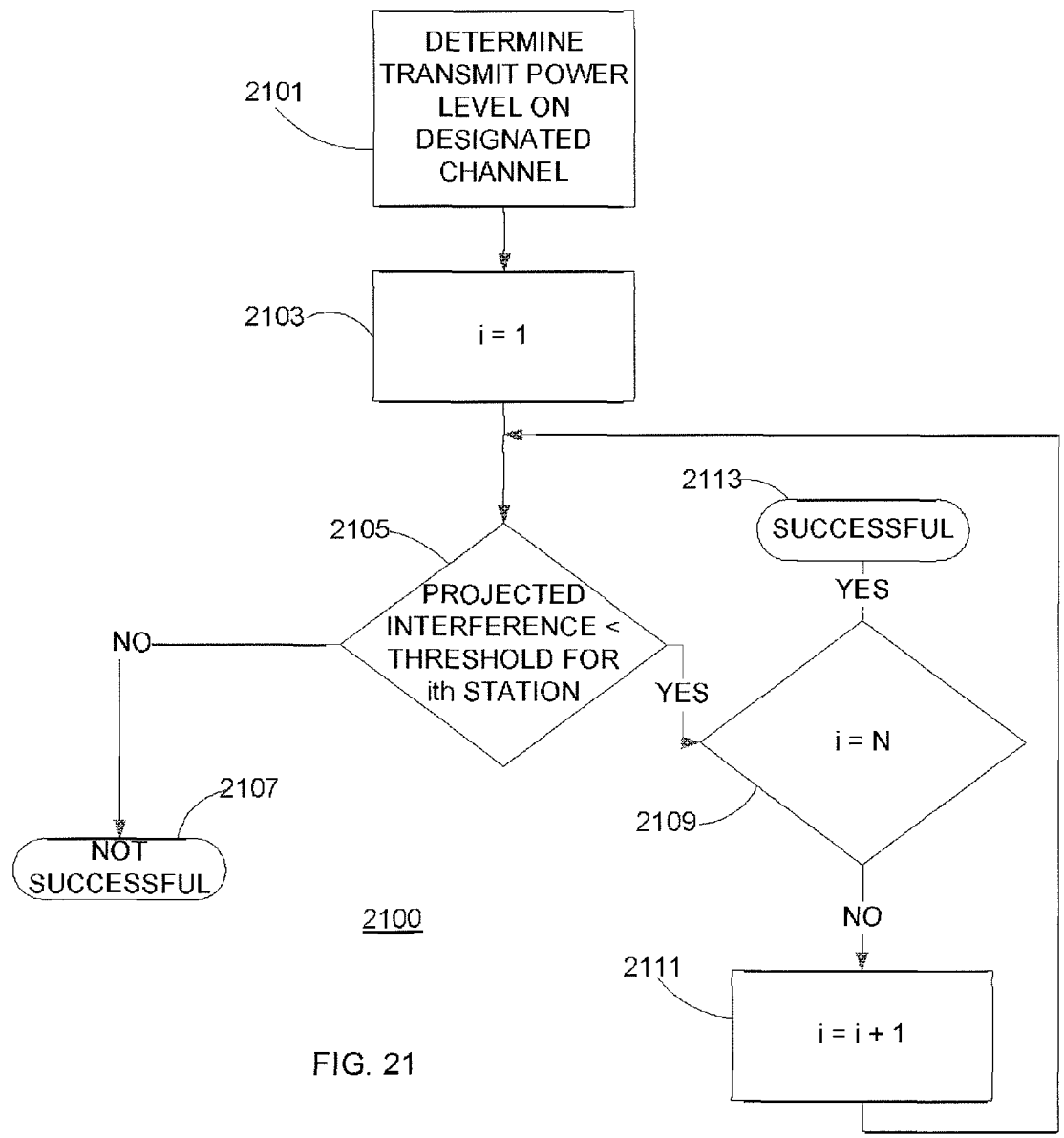
FIG. 21 shows a transmit power determination process for an ad hoc station in accordance with an embodiment of the invention.

FIG. 20 shows data transmitting procedure 2000 for an ad hoc station in accordance with an embodiment of the invention. In the scenario associated with procedure 2000, the wireless station desires to send data to another wireless station in the ad hoc network. In step 2001, the wireless station determines if the broadcast channel corresponds to the establishment channel. If not, the wireless station waits for the next broadcast channel in step 2009. If the broadcast channel corresponds to the establishment channel, the wireless station determines the transmit power level in procedure 2003 (corresponding to procedure 2100 as shown in FIG. 21 and will be discussed) to communicate with the other wireless station while keeping the interference level at the wireless stations in the ad hoc network below a maximum acceptable level. If procedure 2003 is successful, as determined by step 2005, the wireless station establishes a connection on the establishment channel in step 2007. Otherwise, the wireless station aborts the attempt and may try again in a subsequent time slice corresponding to the establishment channel.

In the embodiment of the invention, when the wireless station establishes the connection on the establishment channel with another wireless station, channel negotiation is executed in step 2007 in order to select a broadcast channel to communicate data between the wireless stations. In an embodiment of the invention, the wireless station may establish a connection on the establishment channel with a central database (e.g., measurement station 1301 as shown in FIG. 13) in order to negotiate a broadcast channel for communications with another wireless station. Moreover, channel negotiation may select a plurality of broadcast channels to obtain a larger bandwidth to increase the data rate. For example, the selection of the plurality of broadcast channels may support a non-channelized data connection, in which data is not designated for a specific broadcast channel. In step 2011, if the broadcast channel does not correspond to the selected broadcast channel, the wireless station waits for the next broadcast channel in step 2019.

When the wireless station determines that the broadcast channel is the selected broadcast channel, the wireless station determines the transmit power level in procedure 2013 (corresponding to procedure 2100). In step 2015, the wireless station accesses database 1500 to determine whether the projected interference level at any of the known wireless stations in the ad hoc network does not exceed a maximum acceptable level. If so, the wireless station transmits data in step 2017 on the selected broadcast channel to the other wireless station. If not successful, the wireless station aborts the procedure and may retry in a subsequent time slice.

FIG. 21 shows transmit power determination procedure 2100 for an ad hoc wireless station in accordance with an embodiment of the invention. Procedure 2100 corresponds to procedures 2003 and 2013 as shown in FIG. 20. In step 2101, the transmit power level on the designated channel is determined. In the embodiment, as previously discussed, the distance between wireless stations is known and the propagation characteristics are assumed in order to determine the necessary transmit power level. A power margin may be included to provide a desired robustness. (In other embodiments of the invention, the transmit power level is determined by the wireless station measuring the received power level of another wireless station and knowing the transmit level at the other wireless station. The power difference corresponds to the power loss between the two wireless stations.) Once the transmit power level is determined, steps 2103-2113 determine whether the associated projected interference level on the designated broadcast channel at all wireless stations in the ad hoc network is below a maximum acceptable limit.

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, digital signal processor, and associated peripheral electronic circuitry.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

We claim:

1. A method comprising:
   determining, at a first wireless station, an idle broadcast channel from a plurality of broadcast channels based on indicators of channel status information for the plurality of broadcast channels, the indicators of the channel status information identifying one or more channels of the plurality of broadcast channels as idle channels;
   initiating a connection on the idle broadcast channel between the first wireless station and a second wireless station; and
   subsequent to the connection being established, transmitting first data over the idle broadcast channel.

2. The method of claim 1, further comprising:
   determining an interference measurement for a first broadcast channel of the plurality of broadcast channels; and
   updating the channel status information based on the interference measurement, wherein updating includes at least one of the following: setting the interference measurement in the channel status information, setting the indicator of the channel status information corresponding to the first broadcast channel based on the interference measurement, and setting channel type information of the channel status information based on the interference measurement and the first broadcast channel.

3. The method of claim 1, further comprising:
determining a first transmit power level; and
wherein the first data is transmitted at the first transmit power level.

4. The method of claim 1, further comprising:
receiving information from the second wireless station;
determining a second broadcast channel based on the received information; and
transmitting second data to the second wireless station over the second broadcast channel.

5. The method of claim 1, further comprising:
transmitting sequentially from the first wireless station one or more signals over the idle broadcast channel, wherein a first signal of the one or more signals is transmitted at a predetermined power level, and wherein subsequent signals of the one or more signals are sequentially transmitted at increasing power levels; and
receiving, at the first wireless station, a response signal over the idle broadcast channel.

6. An apparatus comprising:
a processor; and
memory storing computer readable instructions that, when executed, cause the apparatus to:
determine an idle broadcast channel from a plurality of broadcast channels based on indicators of channel status information for the plurality of broadcast channels, the indicators of the channel status information identifying one or more channels of the plurality of broadcast channels as idle channels;
initiate a connection on the idle broadcast channel between the apparatus and a second apparatus; and
subsequent to the connection being established, transmit first data over the idle broadcast channel.

7. The apparatus of claim 6, wherein the idle broadcast channel is associated with a time slice, and the transmitting occurs at a transmission time for the time slice.

8. The apparatus of claim 6, wherein the memory further stores instructions that, when executed, cause the apparatus to:
detect transmission parameter signaling (TPS) information broadcast over the plurality of broadcast channels.

9. The apparatus of claim 6, wherein the channel status information is based only on a network information table (NIT) of a DVB-H system.

10. The apparatus of claim 6, wherein the memory further stores instructions that, when executed, cause the apparatus to:
analyze a frequency spectrum of the plurality of broadcast channels and update the channel status information based on the analysis.

11. The apparatus of claim 6, wherein the memory further stores instructions that, when executed, cause the apparatus to:
retrieve the channel status information from a database.

12. The apparatus of claim 6, wherein the channel status information is received from the second apparatus.

13. The apparatus of claim 6, wherein the memory further stores instructions that, when executed, cause the apparatus to:
determine an interference measurement for a first broadcast channel of the plurality of broadcast channels; and
update the channel status information based on the interference measurement, wherein updating includes at least one of the following: setting the interference measurement in the channel status information, setting the indicator of the channel status information corresponding to the first broadcast channel based on the interference measurement, and setting channel type information of the channel status information based on the interference measurement and the first broadcast channel.

14. The apparatus of claim 13, wherein the interference measurement includes an interference temperature of the first broadcast channel.

15. The apparatus of claim 6, wherein wherein the memory further stores instructions that, when executed, cause the apparatus to:
receive one or more interference measurements via the idle broadcast channel; and
update the channel status information based on the received interference measurements.

16. The apparatus of claim 6, wherein the first data is transmitted according to at least one of the following: DVB-H, DVB-T, ATSC, and ISDB-T.

17. The apparatus of claim 6, wherein the first data corresponds to a file type selected from a group consisting of an image, a video file, an audio file, and a multimedia file.

18. The apparatus of claim 6, wherein the first data comprises Internet Protocol data packets.

19. The apparatus of claim 6, wherein the memory further stores instructions that, when executed, cause the apparatus to:
receive information from the second apparatus;
determine a second broadcast channel based on the received information; and
transmit second data over the second broadcast channel.

20. The apparatus of claim 6, wherein the memory further stores instructions that, when executed, cause the apparatus to:
receive broadcast data over one of the plurality of broadcast channels, wherein the received broadcast data is associated with one or more broadcast services.

21. The apparatus of claim 20, wherein the memory further stores instructions that, when executed, cause the apparatus to:
render the received broadcast data for viewing on a display of the apparatus.

22. The apparatus of claim 6, wherein the memory further stores instructions that, when executed, cause the apparatus to:
determine a first transmit power level, wherein the first data is transmitted at the first transmit power level.

23. The apparatus of claim 22, wherein determining the first transmit power includes:
obtaining a distance between the apparatus and the second apparatus;
calculating, based on the distance, a predicted propagation loss of a signal traveling from the apparatus to the second apparatus; and
adjusting the first transmit power level to compensate for the propagation loss.

24. The apparatus of claim 22, wherein determining the first transmit power includes:
obtaining a second transmit power level of the signal received from the second apparatus;
determining a received power level of the signal at the receiver;
calculating, based on the second transmit power level and the received power level, a propagation loss of the signal; and
adjusting the first transmit power level to compensate for the propagation loss.

25. The apparatus of claim 22, wherein the memory further stores instructions that, when executed, cause the apparatus to:

determine a projected interference level that would result from transmitting the first data at the first transmit power level; and determine that the projected interference level does not exceed a predetermined level.

26. The apparatus of claim 6, wherein the memory further stores instructions that, when executed, cause the apparatus to:

receive information over the idle broadcast channel;

determine a second broadcast channel based on the received information; and establish a connection over the second broadcast channel.

27. The apparatus of claim 26, wherein the memory further stores instructions that, when executed, cause the apparatus to:

transmit one or more signals over the idle broadcast channel, wherein a first signal of the one or more signals is set to be transmitted at a predetermined power level, and wherein subsequent signals of the one or more signals are set to be sequentially transmitted at increasing power levels; and receive a response signal over the idle broadcast channel.

28. The apparatus of claim 27, wherein the power levels at which the one or more signals are transmitted do not exceed a predetermined limit.

29. The apparatus of claim 27, wherein the memory further stores instructions that, when executed, cause the apparatus to:

stop transmitting the one or more signals over the second idle broadcast channel after receiving the response.

30. The apparatus of claim 26, wherein the memory further stores instructions that, when executed, cause the apparatus to:

determine a transmit power level to send communication data to the second apparatus over the second broadcast channel;

determine projected interference levels that would result from transmitting the communication data at the transmit power level;

determine that the projected interference levels do not exceed predetermined levels; and transmit the communication data over the second broadcast channel at the transmit power level.

31. The apparatus of claim 30, wherein the memory further stores instructions that, when executed, cause the apparatus to:

initiate a channel negotiation, wherein the received information is related to the negotiation.

32. A non-transitory computer-readable medium having stored thereon computer-executable instructions that, when executed, cause an apparatus to:

determine an idle broadcast channel from a plurality of broadcast channels based on indicators of channel status information for the plurality of broadcast channels, the indicators of the channel status information identifying one or more channels of the plurality of broadcast channels as idle channels;

initiate a connection on the idle broadcast channel between the apparatus and a second apparatus; and subsequent to the connection being established, transmit first data over the idle broadcast channel.

33. The method of claim 1, wherein the idle broadcast channel is associated with a first broadcast service, the first data is related to a second broadcast service, and the first broadcast service and the second broadcast service are different services.

\* \* \* \* \*